US012432034B2

United States Patent
Lee et al.

(10) Patent No.: US 12,432,034 B2
(45) Date of Patent: Sep. 30, 2025

(54) METHOD, TRANSMISSION DEVICE, PROCESSING DEVICE, AND STORAGE MEDIUM FOR TRANSMITTING REFERENCE SIGNAL, AND METHOD AND RECEPTION DEVICE FOR RECEIVING REFERENCE SIGNAL

(71) Applicant: LG ELECTRONICS INC., Seoul (KR)

(72) Inventors: Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 18/027,322

(22) PCT Filed: Sep. 27, 2021

(86) PCT No.: PCT/KR2021/013125
§ 371 (c)(1),
(2) Date: Mar. 20, 2023

(87) PCT Pub. No.: WO2022/065948
PCT Pub. Date: Mar. 31, 2022

(65) Prior Publication Data
US 2023/0361965 A1 Nov. 9, 2023

(30) Foreign Application Priority Data

Sep. 25, 2020 (KR) .................. 10-2020-0124373

(51) Int. Cl.
H04L 5/00 (2006.01)
H04W 16/28 (2009.01)
H04W 72/0453 (2023.01)

(52) U.S. Cl.
CPC ........... *H04L 5/0051* (2013.01); *H04W 16/28* (2013.01); *H04W 72/0453* (2013.01)

(58) Field of Classification Search
CPC ... H04L 5/0051; H04L 5/0023; H04L 5/0048; H04L 5/0094; H04W 16/28;
(Continued)

(56) References Cited

U.S. PATENT DOCUMENTS

2017/0322300 A1 11/2017 Kageme et al.
2018/0152331 A1 5/2018 Ma et al.
(Continued)

OTHER PUBLICATIONS

PCT International Application No. PCT/KR2021/013125, International Search Report dated Jan. 14, 2022, 21 pages.
(Continued)

*Primary Examiner* — Eric Myers
(74) *Attorney, Agent, or Firm* — LEE, HONG, DEGERMAN, KANG & WAIMEY

(57) ABSTRACT

A transmission device in a wireless communication system: maps respective reference signals for a plurality of antennas to frequency resources; and transmits the reference signals on the frequency resources. Mapping the reference signals to the frequency resources comprises mapping the reference signals such that: (i) the frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$; and (ii) the frequency difference between the frequency resource $f_{m,n}$ and a frequency resource $f_{m,n-1}$ for a reference signal of an antenna $V_{m,n-1}$ is $\Delta f_n$, wherein m is an antenna index along a first direction, and n is an antenna index along a second direction orthogonal to the first direction.

14 Claims, 18 Drawing Sheets

(58) Field of Classification Search
CPC .............. H04W 72/0453; H04W 16/02; H04B 7/0408; H04B 7/06; H04B 7/0404
See application file for complete search history.

(56) References Cited

U.S. PATENT DOCUMENTS

| | | |
|---|---|---|
| 2019/0268117 A1 | 8/2019 | Nilsson |
| 2019/0280833 A1 | 9/2019 | Athley et al. |
| 2023/0030823 A1* | 2/2023 | Wang .................... H04L 5/0048 |
| 2023/0155758 A1* | 5/2023 | Park ...................... H04L 27/261 |
| | | 370/329 |
| 2023/0171057 A1* | 6/2023 | Cha ....................... H04L 27/262 |
| | | 370/329 |

OTHER PUBLICATIONS

Qasim Sultan et al., "Fast 3D Beamforming Technique for Millimeter-Wave Cellular Systems With Uniform Planar Arrays", IEEE Access vol. 8, Jul. 2020, 16 pages.

* cited by examiner $\phi - \Delta\phi \qquad \phi \qquad \phi + \Delta\phi$ $\omega - \Delta\omega \qquad \omega \qquad \omega + \Delta\omega$

FIG. 9
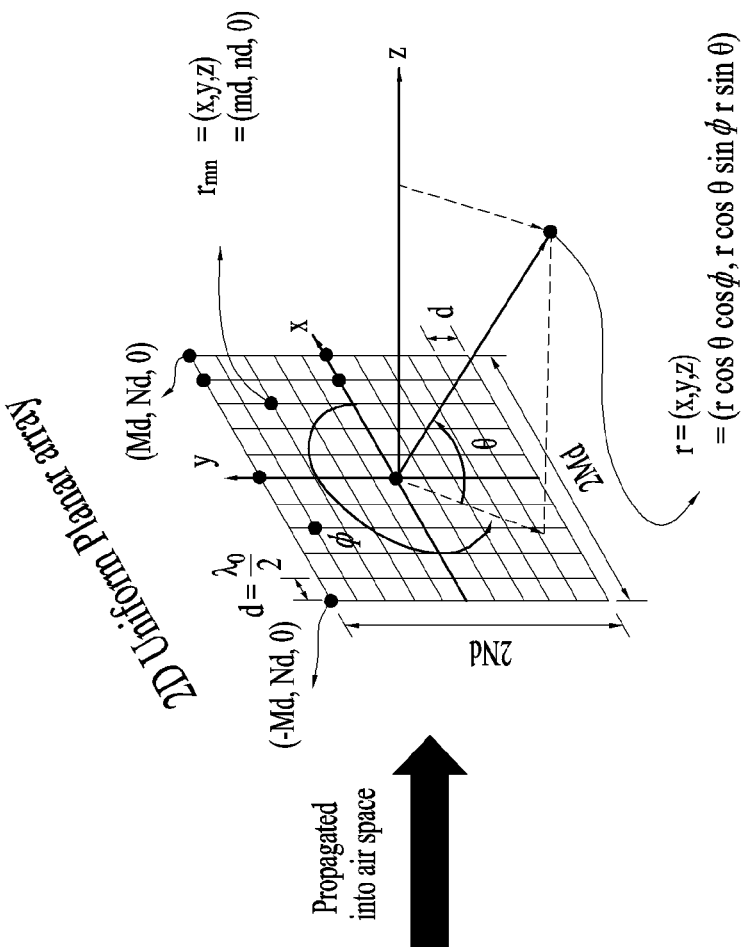
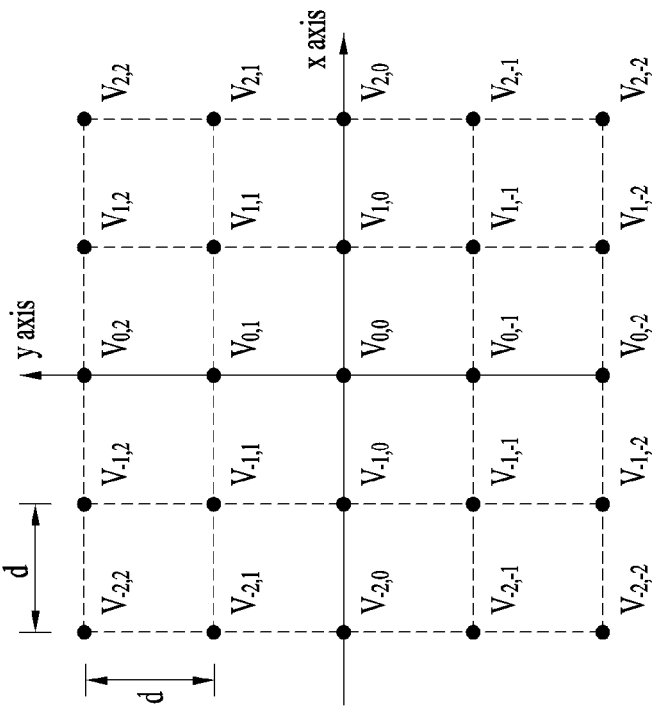

METHOD, TRANSMISSION DEVICE, PROCESSING DEVICE, AND STORAGE MEDIUM FOR TRANSMITTING REFERENCE SIGNAL, AND METHOD AND RECEPTION DEVICE FOR RECEIVING REFERENCE SIGNAL

CROSS-REFERENCE TO RELATED APPLICATIONS

This application is the National Stage filing under 35 U.S.C. 371 of International Application No. PCT/KR2021/013125, filed on Sep. 27, 2021, which claims the benefit of earlier filing date and right of priority to Korean Application No. 10-2020-0124373, filed on Sep. 25, 2020, the contents of which are all incorporated by reference herein in their entirety.

TECHNICAL FIELD

The present disclosure relates to an optical wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication (e.g., 5G).

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

Although 5G communication is still under development, demand for higher data rate is increasing in order to accommodate new services such as virtual reality or autonomous driving.

SUMMARY

As new radio communication technology has been introduced, the number of UEs to which a base station (BS) should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, provided herein is a method of transmitting reference signals for a plurality of antennas by a transmission device in a wireless communication system. The method includes: mapping respective reference signals for the plural antennas to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$, where m denotes an antenna index according to a first direction, and n denotes an antenna index according to a second direction orthogonal to the first direction.

In another aspect of the present disclosure, provided herein is a transmission device for transmitting reference signals for a plurality of antennas in a wireless communication system. The transmission device includes: the plural antennas; at least one transceiver; at least one processor; and at least one computer memory operably connectable to the at least one processor and configured to store instructions that, when executed, cause the at least one processor to perform operations. The operations include: mapping respective reference signals for the plural antennas to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$, where m denotes an antenna index according to a first direction, and n denotes an antenna index according to a second direction orthogonal to the first direction.

In another aspect of the present disclosure, provided herein is a processing device. The processing device includes: at least one processor; and at least one computer memory operably connectable to the at least one processor and configured to store instructions that, when executed, cause the at least one processor to perform operations. The operations include: mapping respective reference signals for the plural antennas to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$, where m denotes an antenna index according to a first direction, and n denotes an antenna index according to a second direction orthogonal to the first direction.

In another aspect of the present disclosure, provided herein is a computer-readable non-volatile storage medium. The computer-readable non-volatile storage medium stores at least one computer program including instructions that, when executed by at least one processor, cause the at least one processor to perform operations for a user equipment (UE). The operations include: mapping respective reference signals for the plural antennas to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$, where m denotes an antenna index according to a first direction, and n denotes an antenna index according to a second direction orthogonal to the first direction.

In another aspect of the present disclosure, provided herein is a computer program stored in a computer program readable storage medium. The computer program includes at least one program code including instructions that, when executed, cause at least one processor to perform operations. The operations include: mapping respective reference signals for the plural antennas to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$, where m denotes an antenna index according to a first direction, and n denotes an antenna index according to a second direction orthogonal to the first direction.

In another aspect of the present disclosure, provided herein is a method of receiving reference signals by a reception device in a wireless communication system. The method includes: receiving a signal including respective reference signals for plural antennas of a transmission device; determining peak information regarding a position of a peak of the signal, based on a first frequency difference $\Delta f_m$ between reference signals of adjacent antennas in a first direction among the plural antennas and on a second frequency difference $\Delta f_n$ between reference signals of adjacent antennas in a second direction, which is orthogonal to the first direction, among the plural antennas; and transmitting the peak information to the transmission device.

In another aspect of the present disclosure, provided herein is a reception device for receiving reference signals in a wireless communication system. The reception device include: at least one transceiver; at least one processor; and at least one computer memory operably connectable to the at least one processor and configured to store instructions that, when executed, cause the at least one processor to perform operations. The operations include: receiving a signal including respective reference signals for plural antennas of a transmission device; determining peak information regarding a position of a peak of the signal, based on a first frequency difference $\Delta f_m$ between reference signals of adjacent antennas in a first direction among the plural antennas and on a second frequency difference $\Delta f_n$ between reference signals of adjacent antennas in a second direction, which is orthogonal to the first direction, among the plural antennas, and transmitting the peak information to the transmission device.

In each aspect of the present disclosure, a configuration for the reference signals may be transmitted.

In each aspect of the present disclosure, the configuration may include information regarding $\Delta f_m$ and information regarding $\Delta f_n$.

In each aspect of the present disclosure, the configuration may further include information regarding the number of antennas of the first direction and information regarding the number of antennas of the second direction.

In each aspect of the present disclosure, the configuration may further include information regarding a sample resolution for sampling.

In each aspect of the present disclosure, the information regarding the sample resolution may include information regarding a system bandwidth of a cell in which the reference signals are transmitted or regarding a bandwidth in which the reference signals are transmitted.

In each aspect of the present disclosure, information regarding a position of a signal peak may be provided by the reception device to the transmission device.

In each aspect of the present disclosure, the information regarding the position of the signal peak may be an index of a sample at which the signal peak is generated.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 9 illustrates a transmission antenna structure usable in some implementations of the present disclosure;

DETAILED DESCRIPTION

Figure 1:
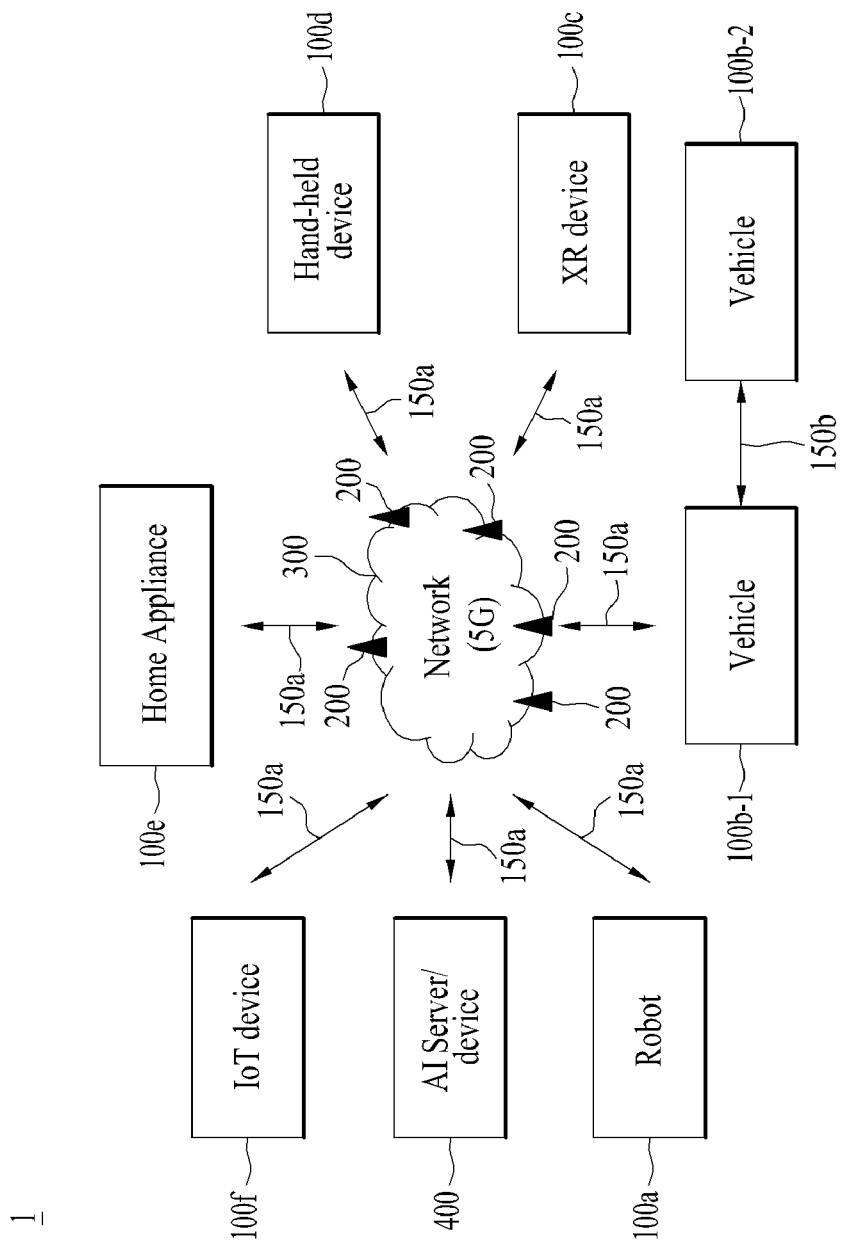
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA 2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation (CA) is supported, linkage between a carrier frequency of the DL resources (or DL CC) and a carrier frequency of the UL resources (or UL CC) may be indicated by system information. In this case, the carrier frequency may be equal to or different from a center frequency of each cell or CC.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR, LTE (e.g., E-UTRA), and 6G and so on) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network, or a 6G network to be introduced in the future. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs. The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
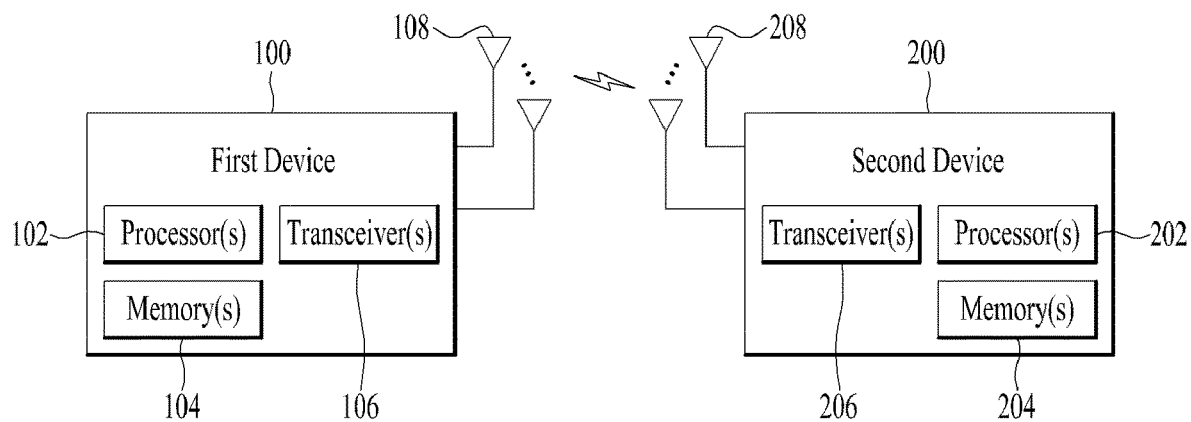
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs. Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT. The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/ signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT. The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4 and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
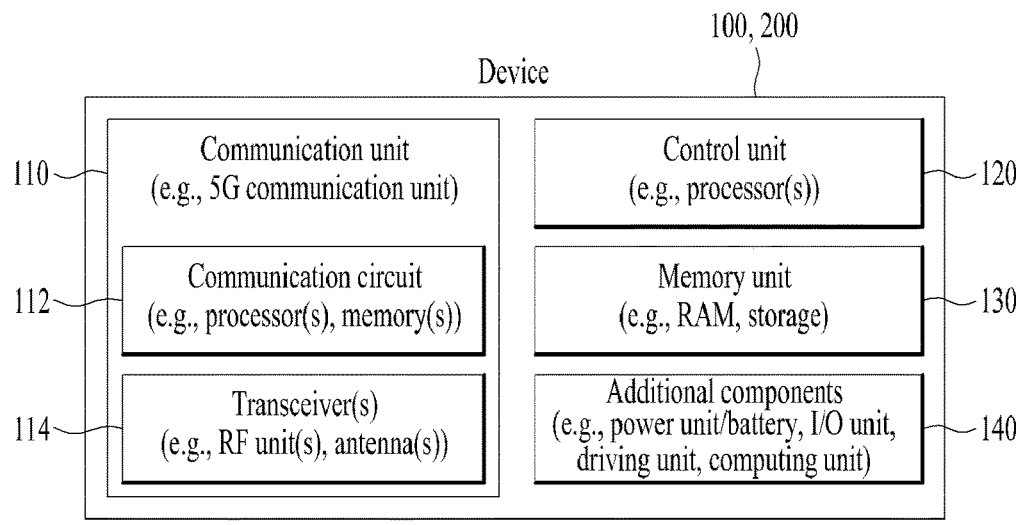
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium A communication device of the present disclosure includes at least one processor; and at least one computer memory operably connected to the at least one processor and configured to store instructions for causing, when executed, the at least one processor to perform operations according to example(s) of the present disclosure described later.

Figure 4:
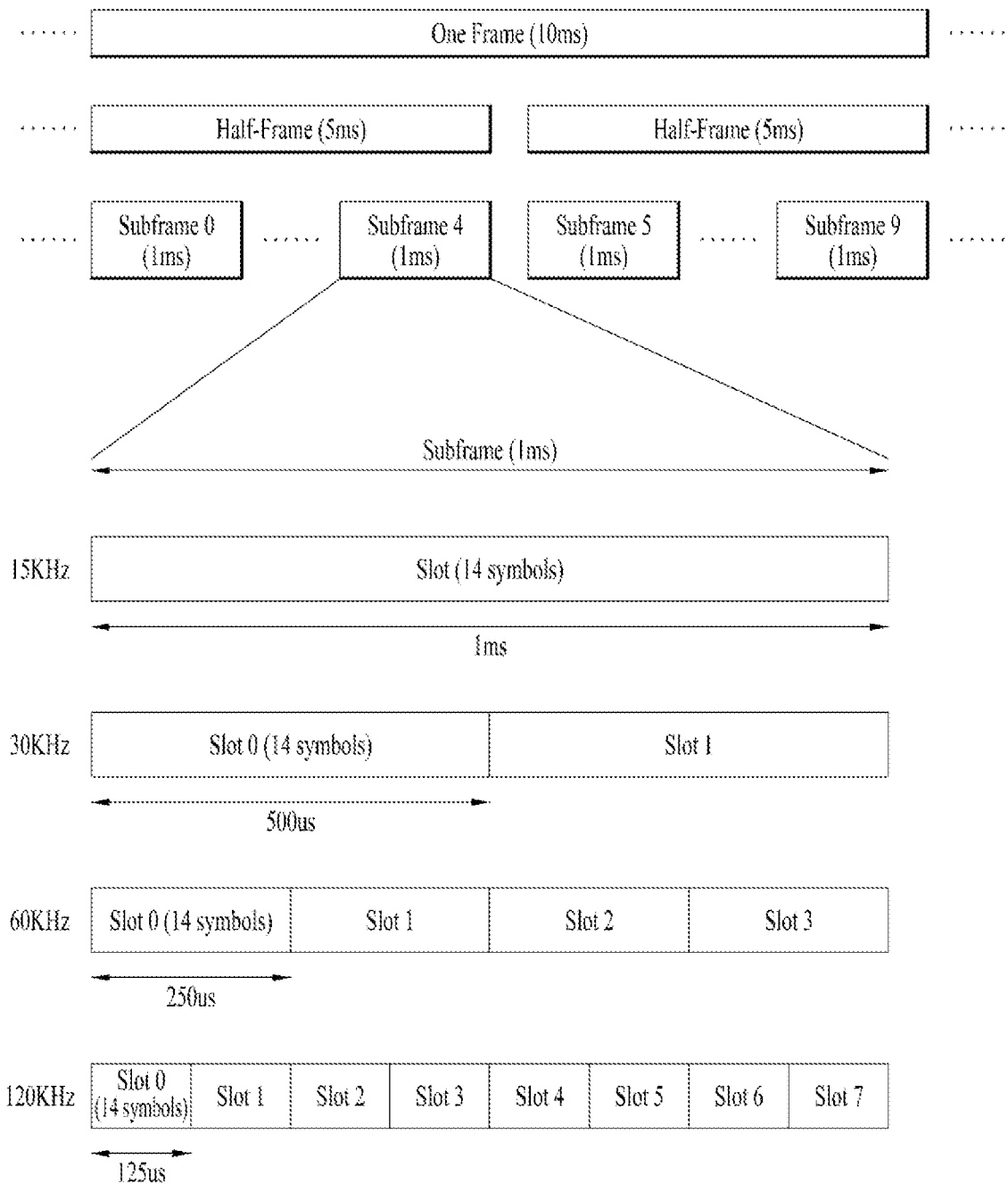
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f/100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_f = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot} - 1\}$ and indexed within a frame in ascending order as follows: $n^u_{s,f} \in \{0, \ldots, n^{frame,u}_{slot} - 1\}$.

Figure 5:
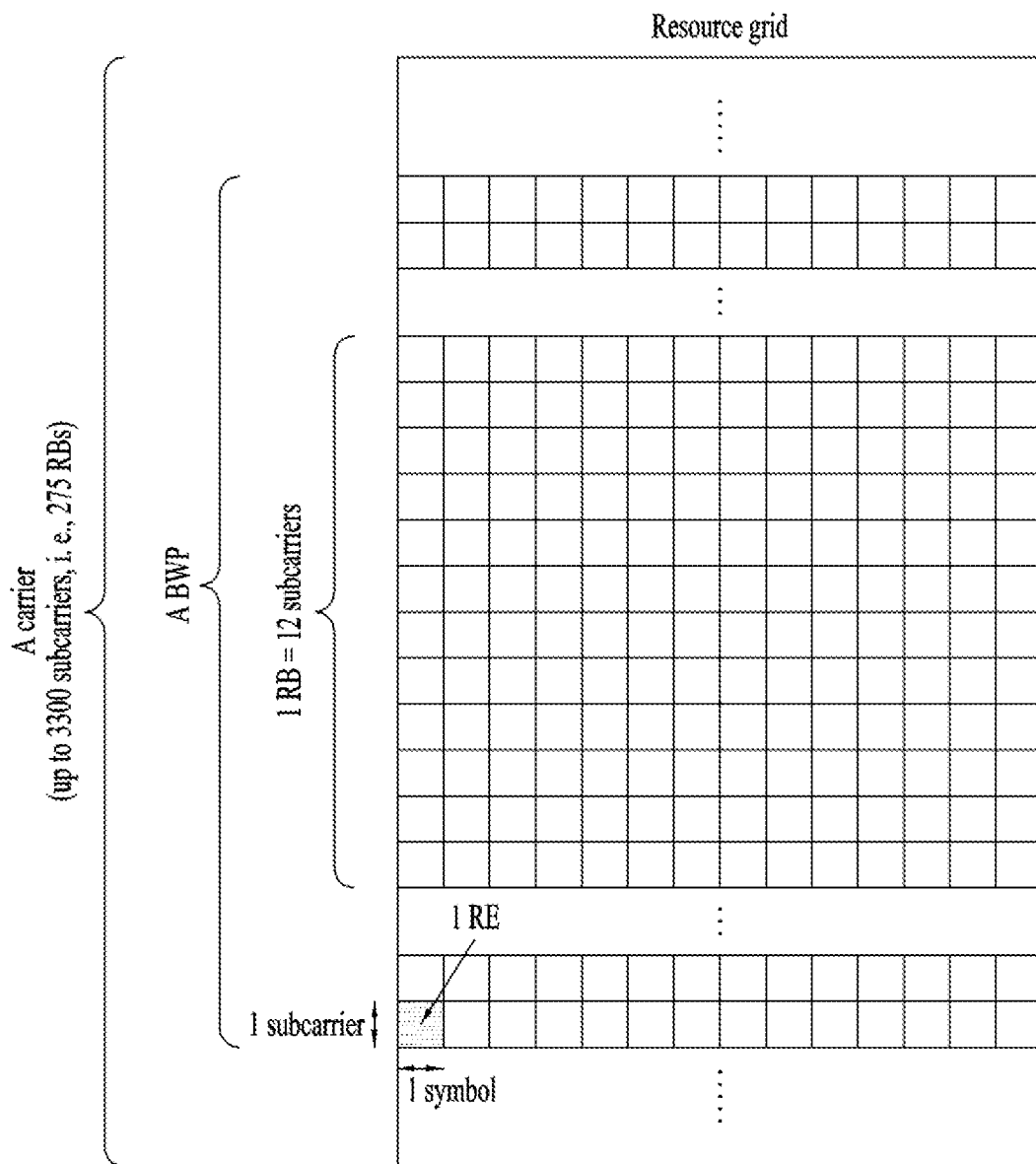
FIG. 5 illustrates a resource grid of a slot.

FIG. 5 illustrates a resource grid of a slot. In the example of FIG. 5, The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain.

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information. UCI types transmitted on the PUCCH include hybrid automatic repeat request (HARQ)-acknowledgment (ACK) information, a scheduling request (SR), and channel state information (CSI). UCI bits may include HARQ-ACK information bits, if any, SR information bits, if any, link recovery request (LRR) information bits, if any, and CSI bits, if any.

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

Demand for higher data rate is increasing to accommodate incoming new services and/or scenarios in which a virtual world and a real world are mixed. To handle such neverending requests, beyond-5G new communication technologies are required. A beyond-6G new communication technology (hereafter, referred to as 6G) system has a purpose of (i) very high data rate per device, (ii) very large numbers of connected devices, (iii) global connectivity, (iv) very low latency, (v) reduction of energy consumption of battery-free IoT devices, (vi) ultra-reliable connection, and (vii) connected intelligence with machine learning capabilities. The following technologies are being considered in the 6G system: artificial intelligence (AI), terahertz (THz) communication, optical wireless communication (OWC), free-space optical (FSO) backhaul networks, massive MIMO technologies, blockchain, three-dimensional (3D) networking, quantum communication, unmanned aerial vehicles (UAVs), cell-free communication, integration of wireless information and energy transmission, integration of sensing and communication, integration of access-backhaul networks, holographic beamforming, big data analysis, and large intelligent surfaces (LIS).

THz communication is one promising solution to a BW limitation problem faced by wireless systems. THz communication may refer to wireless communication in a THz band using an extremely high carrier frequency of 100 GHz or higher, performed using THz waves having a frequency of approximately 0.1 to 10 THz (1 THz=$10^{12}$ Hz). The THz waves are located between a radio frequency (RF)/millimeter (mm) band and an infrared band. The THz waves (i) deeply penetrate non-metal/non-polarizable materials as compared with visible/infrared light, have high linearity due to shorter wavelength than RF/millimeter waves, and enable beams to be converged. In addition, since the photon energy of the THz waves is only a few meV, the THz waves are harmless to the human body. A frequency band expected to be used for THz communication may be a D-band (110 GHz to 170 GHz) or H-band (220 GHz to 325 GHz) with low propagation loss due to molecular absorption in the air.

In the present disclosure, a method of controlling a beam of a wireless communication system is considered. When a high frequency such as THz is used for communication, the length of a wavelength is shortened and the spacing between antennas which is proportional to the length of the wavelength may be reduced. In this case, more antennas may be deployed in the same space and a narrower beam width may be operated through more antennas. In addition, since attenuation due to pathloss further increases when a high frequency is used, generating a pencil beam is essential for even coverage.

As described above, in communication utilizing pencil beams (e.g., THz communication), a large number of transmission and/or reception (Tx/Rx) beams may exist in a single cell. In order to form a link between the Tx and Rx beams, a beam tracking procedure for ensuring beam alignment is required for an initial connection step or for maintenance of link connection. When the number of beams is very large, a very long beam search time is required to check the degree of alignment of each beam. In a 3GPP NR-based communication system, in the case of a stage of performing beam search through a synchronization signal block (SSB), a UE may perform symbol-level beam search through as many (OFDM) symbols as the number of beams. Multi-step beam search in which the UE first searches for broad beams and finds narrow beams within the searched beams requires handshaking between a Tx device and an Rx device and generates delay due to the handshaking. Therefore, in a system using pencil beams, a method for solving resource loss and delay due to a large number of beams is required.

In addition, in a method of performing beam steering using a phased array antenna based on a phase shifter, beam steering resolution is determined according to a quantized level of the phase shifter used. That is, in the case of the system using the pencil beams, since the beam width is very narrow, a phase should be finely controllable and thus it may be difficult to satisfy the demand. In addition, since the phase shifter-based method requires mounting of a phase shifter for each antenna, there are disadvantages in terms of size and cost and a heat problem may also occur. Therefore, an alternative method capable of solving the disadvantages of the method using multiple phase shifters is required.

In this disclosure, a method and a transmitter using a device having a frequency gradient array (e.g., a 1-dimensional or 2-dimensional antenna array) as a Tx antenna is described.

Figure 6:
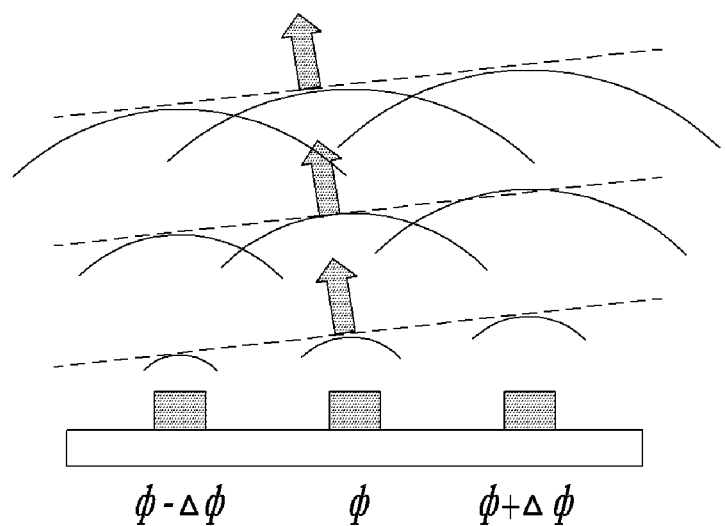
FIG. 6 illustrates a beam direction formed by a phased array antenna.

FIG. 6 illustrates a beam direction formed by a phased array antenna.

Generally, in a phased array antenna used for beamforming, since a phase of a signal emitted from each antenna element differs, a direction in which signals superpose due to a difference in radiation time of the signals, causing constructive interference, is determined by a phase. For example, referring to FIG. 6, when there is a phase difference of $\Delta\varphi$ between antennas, the beam direction of radiated signals is formed by the phase difference.

Figure 7:
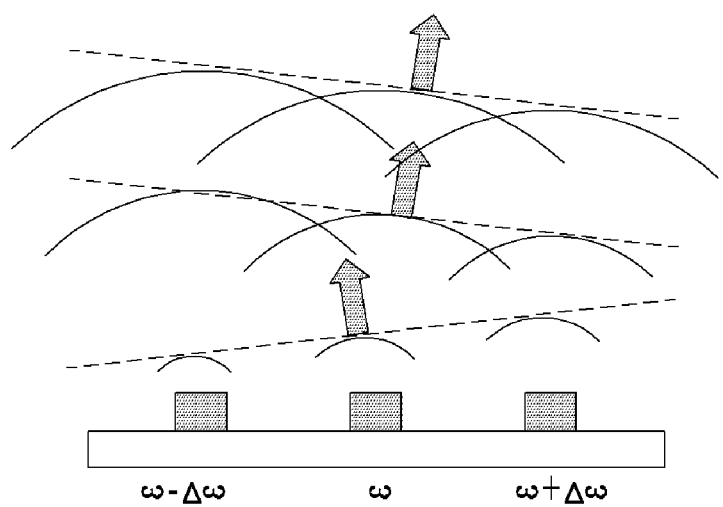
FIG. 7 illustrates a beam direction formed by a frequency gradient array antenna.

FIG. 7 illustrates a beam direction formed by a frequency gradient array antenna.

Unlike the phased array antenna, in the frequency gradient array antenna, since an angular frequency of a signal emitted from each antenna element differ, a location at which signals superpose due to a difference in frequency, causing constructive interference, varies over time. Here, although the frequency is $\omega=2\pi f$ as an angular frequency, the angular frequency is expressed as a frequency for convenience of description. Referring to FIG. 7, for example, when there is a frequency difference of $\Delta\omega$ between antennas, beam directions of radiated signals are differently formed over time due to the frequency difference.

Figure 8:
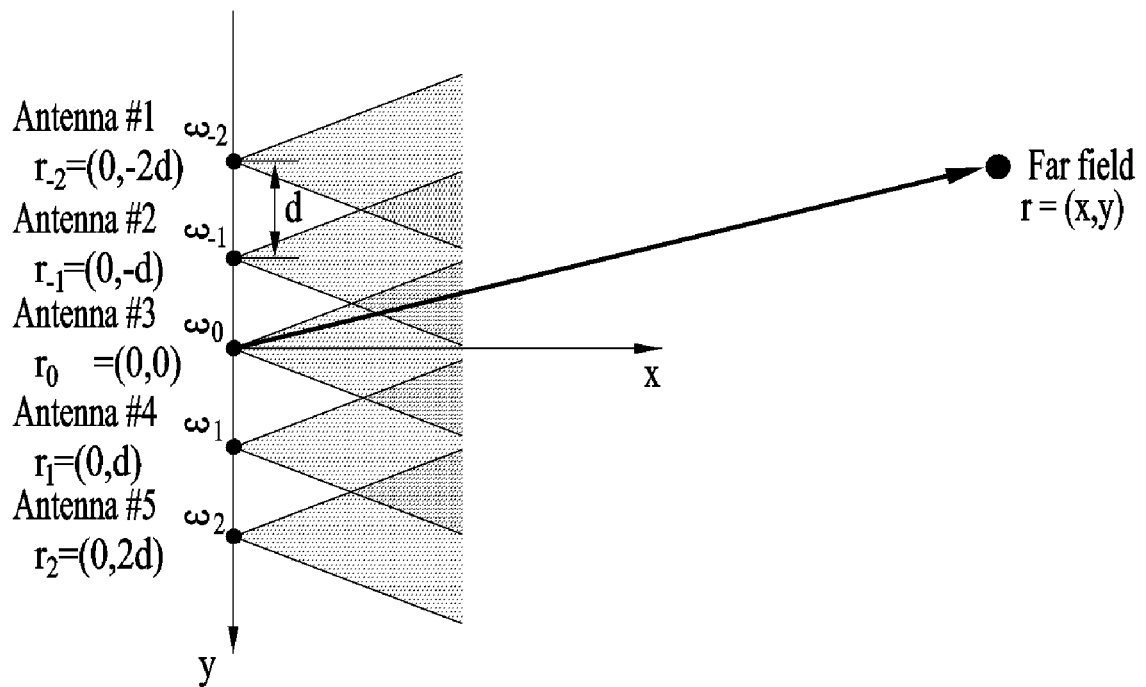
FIG. 8 is a diagram illustrating the relationship between signals passing through antennas and spacing between the antennas.

FIG. 8 is a diagram illustrating the relationship between signals passing through antennas and spacing between the antennas.

A signal that passes through an antenna and arrives at an arbitrary far field coordinate $r=(x,y)=(r*\cos(\theta),-r*\sin(\theta))$ may be represented as $b_n(r)=a_n*G(r-r_n)*e^{\wedge}(-j*k_n(|r-r_n|))$. Here, $G(r-r_n)$ denotes a gain change value due to propagation from an n-th antenna $r_n=(0,n*d)$ to the coordinate $r=(x,y)$, $|r-r_n|$ denotes the distance between two coordinates, and $k_n=\omega_n/c=k_0+n*\Delta k$. If reception for all signals is performed in consideration of a time variation t at the coordinate r, then $b(r,t)=\Sigma_{-N}^{N} b_n(r) e^{-j\omega_n t}=\Sigma_{-N}^{N}a_n G(r-r_n) e^{-j(k_n|r-r_n|-\omega_n t)}$. That is, b(r,t) represents the sum of gain and phase at the coordinate r and at the time t when each wave passing through each antenna arrives at the coordinate r.

In this case, since $r \gg N*d$ in a far field, the difference between $|r|$ and $|r_n|$ is relatively small, and an approximation of $G(r-r_n) \cong G(r)$ may be made. If the difference is represented as a spherical coordinate system, the difference may approximate to $|r-r_n|=\sqrt{(r\sin\theta+nd)^2+r^2\cos^2\theta} \cong r+n*d*\sin(\theta)$ in the far field. In summary, $b(r,t) \cong G(r)e^{-j(k_0 r-\omega_0 t)} \Sigma_{-N}^{N}a_n e^{-jn(\Delta kr+k_0 d \sin\theta-\Delta\omega t)}$. b(r,t) may be summarized as a pulsed signal form by distinguishing between gain and the product of a phase variation term $e^{\wedge}(-j*\omega_0*t)$ according to a dominant time in a center frequency and an envelope A(t) of a pulsed signal: $b(r,t) \cong A(t-(k_0*d/\Delta\omega)*\sin(\theta)-r/c)*G(r)*e^{\wedge}(-j*(k_0*r-\omega_0*t))$. Here, when $A(t)=\Sigma_{-N}^{N}a_n e^{-jn\Delta\omega t}$, it may be understood that a peak of a synthesized pulse of signals radiated from a linear antenna array is time-shifted according to a relationship of $k_0*d/\Delta\omega$ at a location corresponding to a distance r and an angle θ at a time t. Therefore, a beam rotation speed and period vary over time by the term $k_0$ reflecting time variation due to a center frequency, an antenna spacing d, and a frequency spacing $\Delta\omega$. These characteristics are summarized as follows. In the following description, a scanning velocity denotes the speed at which a beam rotates relative to a reference rotation angle, and a repetition time denotes time required for a beam to rotate and return to an original position again.

Influence of $\Delta\omega$:

A repetition time $\tau=2\pi/\Delta\omega$ is determined irrespective of a center frequency $\omega_0$.

Influence of d upon fixing the center frequency $\omega_0$ (hereinbelow, a wavelength $\lambda_0=c/f_0=2\pi*c/\omega_0$ and c is the speed of light, about $3\times10^8$ m/s):

If $d=\lambda_0/2$, a beam rotates in the entire radiation space by a virtual antenna during the repetition time. $d=\lambda_0/2$ is referred to as a reference scanning velocity.

If $d<\lambda_0/2$, a beam rotates faster than the reference scanning velocity and rotates in the entire radiation space in a shorter time than the repetition time, resulting in blank beam time (i.e., a phenomenon in which a beam disappears).

If $d>\lambda_0/2$, a beam rotates slower than the reference scanning velocity and rotates in the entire radiation space for a time longer than the repetition time, so that it looks like the next beam rotates while one beam rotates. Therefore, a phenomenon arises in which a plurality of beams exists in the entire radiation space.

In addition, in the antenna array illustrated in FIG. 8, since a plurality of waves superposes as the number, 2N+1, of frequency combs increases, the sharpness of the envelope A(t) of a pulse increases and thus beam width decreases.

Hereinafter, some implementations of the present disclosure will be described in which beam steering and/or reception is performed in a space of a desired effective scan range for a very short time using a frequency gradient.

Implementation 1) Fast Beam Tracking

In some implementations of the present disclosure, a transmitter may transmit RSs with a difference of $\Delta f_m$ on the x-axis or in the horizontal domain and with a difference of $\Delta f_n$ on the y-axis or in the vertical domain, for each antenna in a multi-antenna structure, and a receiver may perform beam tracking by measuring the size of a received signal at a sample level of a single carrier scheme. The receiver may feed back an index of the measured sample to the transmitter.

FIG. 9 illustrates a Tx antenna structure usable in some implementations of the present disclosure.

Hereinafter, for convenience of description, a Tx antenna structure of a two-dimensional (2D) uniform planar array (UPA) as illustrated in FIG. 9 is considered. A signal transmitted from each antenna $V_{m,n}$ may be expressed as: $V_{m,n}=a_{mn}e^{-j(\omega_{mn}t-\varphi_{mn})}$. Here, m and n denote an x-axis antenna index and a y-axis antenna index, respectively. Referring to the left view of FIG. 9, for example, $V_{0,0}$ represents an antenna located at the center of the antenna array, $V_{1,0}$ represents the first antenna in a positive direction of the x-axis from $V_{0,0}$, $V_{-1,0}$ represents the first antenna in a negative direction of the x-axis from $V_{0,0}$, $V_{0,1}$ represents the first antenna in a positive direction of the y-axis from $V_{0,0}$, and $V_{0,-1}$ represents the first antenna in a negative direction of the y-axis from $V_{0,0}$. In this case, $\omega_{nm}=\omega_0+m\Delta\omega_m+n\Delta\omega_n=2\pi(f_0+m\Delta f_m+n\Delta f_n)$, where $\omega_0$ denotes an angular frequency relative to the center frequency of a source signal, $\omega_m$ denotes a spacing between angular frequency combs corresponding to the x-axis antenna index, and $\omega_n$ denotes a spacing between angular frequency combs corresponding to the y-axis antenna index. Thus, $f_0$ denotes the center frequency of the source signal, $f_m$ denotes a spacing between frequency combs corresponding to the x-axis antenna index, and $f_1$ denotes a spacing between frequency combs corresponding to the y-axis antenna index. $a_{mn}$ denotes the amplitude of a Tx signal, $\omega_{mn}$ denotes the angular frequency of the Tx signal, and $\varphi_{mn}$ denotes the phase of the Tx signal. Since all frequency signals, including frequency indexes from −N to N and frequency indexes from −M to M, are synthesized, the total number of frequency combs is $(2N+1)^2$. If no processing is applied to the signal, it may be assumed that $\varphi_{mn}=0$ since the phases of all frequency signals are the same.

If all signals in the 2D UPA space are synthesized for a time t and are radiated to a coordinate r in the 3D space, this may be expressed as b(x, y, z, t) and may be represented in a spherical coordinate system converted as follows:

$$b(r,\theta,\phi,t)=b(r,t)=\sum_{n=-N}^{n=N}\sum_{m=-M}^{m=M}\alpha_{mn}G(r-r_{mn})e^{j(K_{mn}\cdot D_{mn}-\omega_{mn}t+\varphi_{mn})}.$$

Here, r denotes a distance separated from an origin, $\varphi$ denotes an angle rotated around the x-axis in the xy plane, θ denotes an angle rotated in the z-axis direction on the xy plane, and $G(r-r_{mn})$ denotes a gain variation value due to propagation to the coordinate $r=(x,y,z)=(r*\cos(\theta)*\cos(\varphi), r*\cos(\theta)*\sin(\varphi), r*\sin(\theta))$ in the (m,n)-th virtual antenna $r_{mn}=(m*d,n*d,0)$. In this case, since a spacing d between antennas is a very small value relative to the distance r (i.e., since r>>N*d or M*d in a far field), an approximation of $G(r-r_{mn})\cong G(r)$ may be made. In addition, $K_{mn}=\omega_{mn}/c=(1/c)*(\omega_0+m\Delta\omega_m+n\Delta\omega_n)=K_0+m\Delta K_m+n\Delta K_n$, and $D_{mn}=|r-r_{mn}|$ which is a distance between two coordinates. For the spherical coordinate system, since $$|r-r_{mn}| = \sqrt{(r\cos\theta\cos\phi - md)^2 + (r\cos\theta\sin\phi - nd)^2 + (r\sin\theta - 0)^2},$$

an approximation of $D_{mn}\approx r-(m*\cos(\theta)*\cos(\varphi)+n*\cos(\theta)*\sin(\varphi))*d$ may be made.

In summary, based on the above approximation, b(r,t) may be represented again as follows:

$$b(r, t) = G(r)e^{-j\omega_0 t}\sum_{n=-N}^{n=N}\sum_{m=-M}^{m=M}a_{mn}e^{j(K_0+m\Delta K_m+n\Delta K_n)(r-(m\cos\theta\cos\phi+n\cos\theta\sin\phi)d)-m\Delta\omega_m t-n\Delta\omega_n t)}e^{j\varphi_{mn}}.$$

That is, given a gain G(r), and a phase term $e^{\wedge}(-j*\omega_0*t)$ according to a center frequency, the intensity of a beam at the coordinate r according to the time t is formed by a combination of components r, θ, and p of the coordinate r and of $\omega_{mn}$. Therefore, the intensity of a beam at the coordinate r according to the time t may be controlled by appropriately controlling $\varphi_{mn}$.

Figure 10:
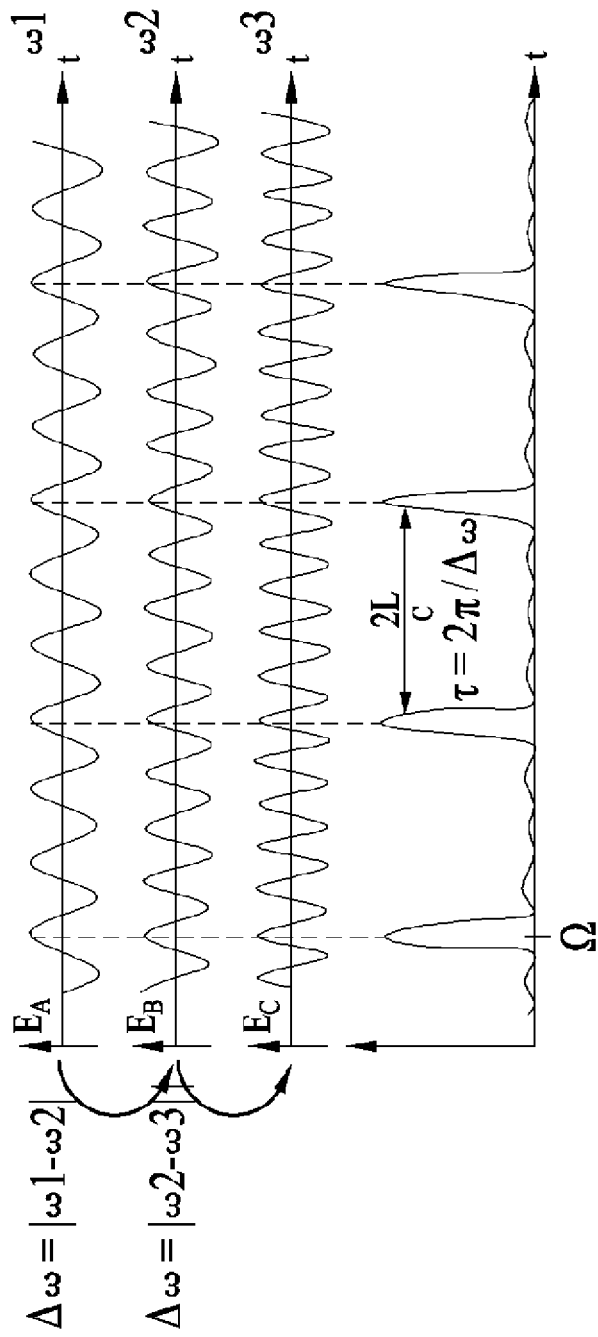
FIG. 10 illustrates the form of a signal received by a receiver in some implementations of the present disclosure.

FIG. 10 illustrates the form of a signal received by a receiver in some implementations of the present disclosure. In particular, the signal illustrated in FIG. 10 is a signal before passing through an analog-to-digital converter (ADC).

The receiver may down-convert a center frequency ω0 of a local oscillator to obtain the signal of the form illustrated in FIG. 10. Here, a time at which the signal strength of the receiver peaks varies according to the azimuth and elevation of the transmitter and the receiver.

Hereinafter, for convenience of description, implementations of the present disclosure will be described based on a signal before passing through a digital-to-analog converter (DAC) in terms of transmission and a signal in a baseband after passing through an ADC in terms of reception.

Figure 11:
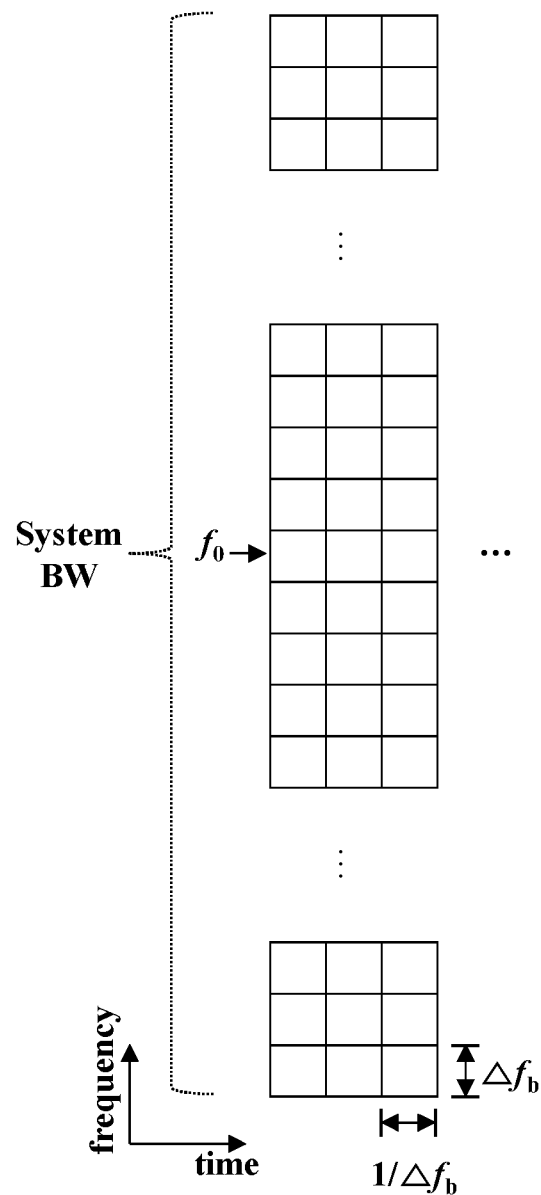
FIG. 11 illustrates an OFDM time/frequency grid usable in some implementations of the present disclosure.

FIG. 11 illustrates an OFDM time/frequency grid usable in some implementations of the present disclosure.

In FIG. 11, $\Delta f_b$ denotes a subcarrier spacing, indicating a frequency corresponding to a minimum beamforming scanning velocity considered in a system. For example, assuming that $\Delta f_b$=1 MHz, a spacing between sample peaks is 1 µs. For reference, if frequencies of antennas are similar, since a spacing $\tau=2\pi/\Delta\omega$ between peaks illustrated in FIG. 10 increases, a beam scanning time increases. Therefore, various beam tracking operations may be performed according to a BW, $\Delta f_m = p_m * \Delta f_b$ (where $p_m$ is a natural number), $\Delta f_n = p_n * \Delta f_b$ (where $p_n$ is a natural number), and the number of antennas. $p_m$ and $p_n$ denote parameters for adjusting the beam scanning time in the x-axis direction and the beam scanning time in the y-axis direction, respectively, and m and n denote the x-axis direction index and y-axis direction index of the antenna, respectively, as mentioned above.

An RS for each antenna is transmitted at a spacing of $\Delta f_m$ in the x-axis direction and at a spacing of $\Delta f_n$ in the y-axis direction. In other words, two antennas adjacent to each other in the x-axis direction transmit respective RSs on frequency resources with a difference of $\Delta f_m$, and two antennas adjacent to each other in the y-axis direction transmit respective RSs on frequency resources with a difference of $\Delta f_n$. In some implementations, the measurement performance of the receiver may be improved by the transmitter not transmitting data on frequency resources, other than a frequency resource on which the RS is transmitted, through each antenna. In contrast, in some implementations, the transmitter may transmit some low-power data along with the RS via antenna(s) even when there is some degradation in received measurement performance. The transmitter according to some implementations of the present disclosure may also be implemented through a$_n$ existing MIMO-OFDM transmission device.

Example #1: BW=10 GHz, M=5, N=0, $\Delta f_b$=10 MHz, $p_m$=10

An antenna array according to Example #1 may be regarded as a uniform linear array (ULA) since antennas are arrayed only in one direction and no antennas are arrayed in the other direction orthogonal to the direction in which antennas are arrayed.

Figure 12:
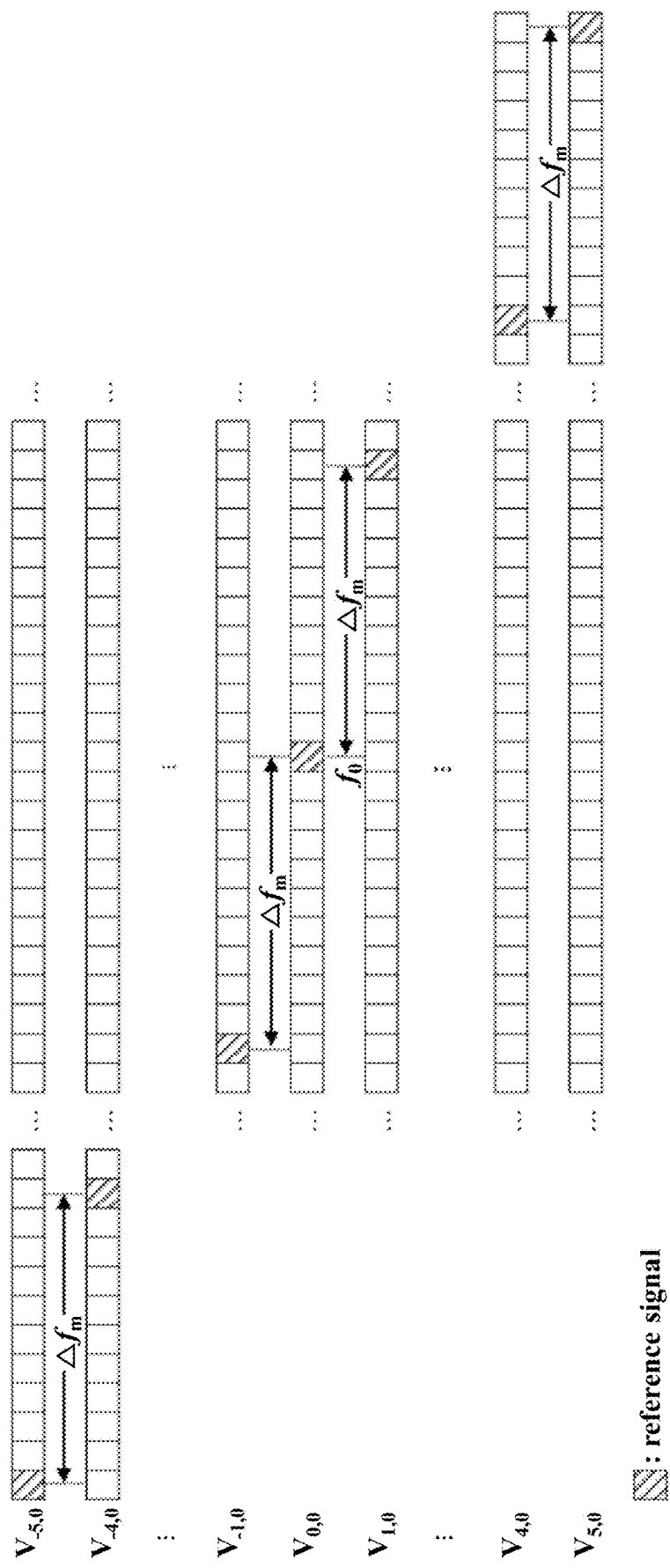
FIG. 12 illustrates an example of frequency locations of reference signals for respective antennas according to some implementations of the present disclosure.

FIG. 12 illustrates an example of frequency locations of RSs for respective antennas according to some implementations of the present disclosure. In particular, FIG. 12 illustrates RSs for respective antennas in the antenna array according to Example #1. In FIG. 12, $V_{m,n}$ represents an antenna having an x-axis antenna index of m and a y-axis antenna index of n, as described in FIG. 9.

According to Example #1, assuming that the antenna array has a total of 11 (2M+1=2*5+1) antennas, a frequency spacing between RSs of the antennas is $\Delta f_m$=100 MHz. For example, the transmitter may transmit RSs for respective antennas in the forms as illustrated in FIG. 12. FIG. 12 illustrates transmission of RSs of antennas in an OFDM frequency resource grid.

Figure 13:
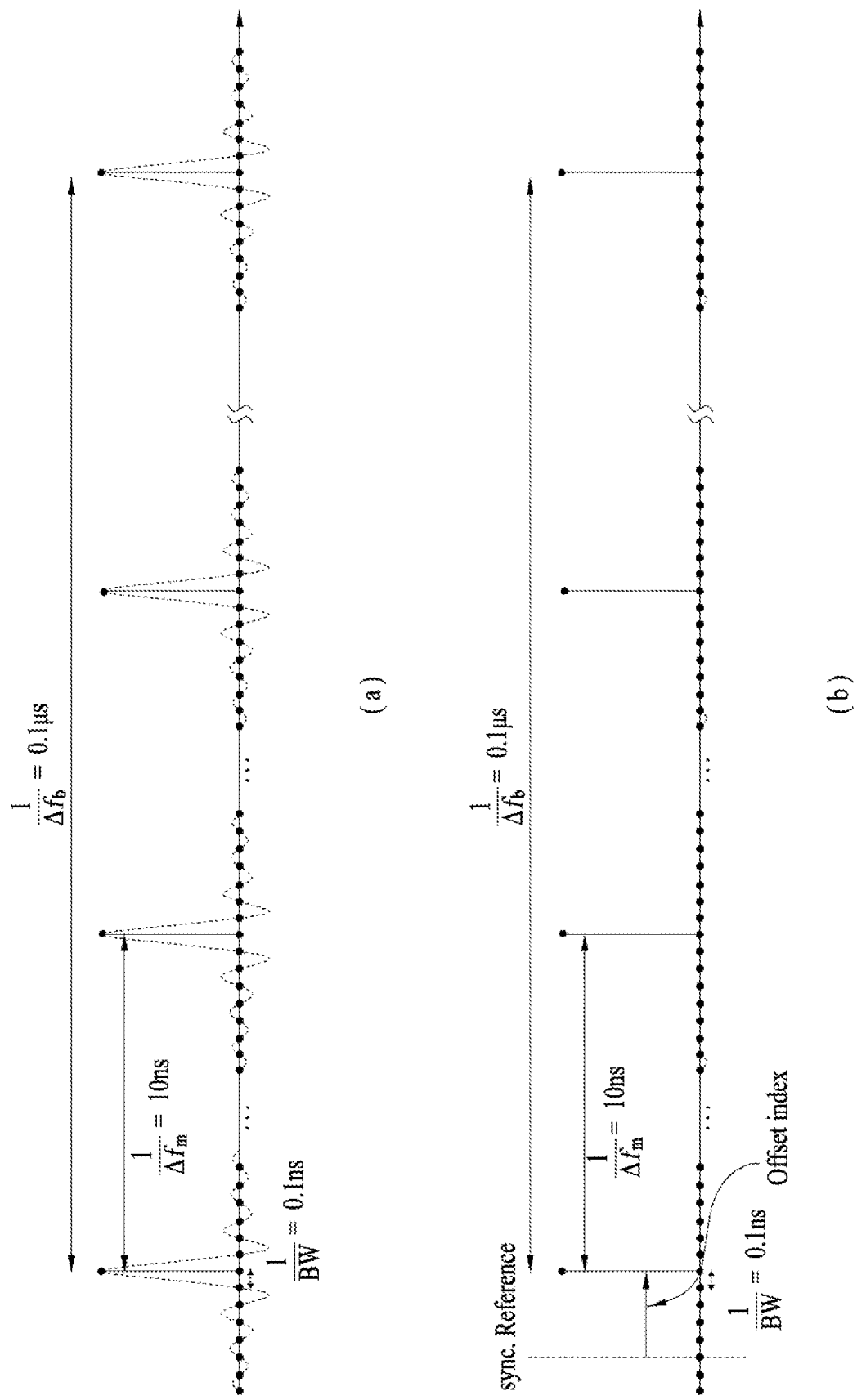
FIG. 13 illustrates forms in which reference signals transmitted according to Example #1 are received by a receiver.

FIG. 13 illustrates forms in which RSs transmitted according to Example #1 are received by a receiver.

Referring to FIG. 13(a), RSs transmitted according to FIG. 12 are received by the receiver as illustrated in FIG. 13. The receiver may sample signals at a spacing of at least 1/BW=0.1 ns. In the examples of FIGS. 12 and 13, since a frequency spacing of RSs between adjacent antennas is at least $\Delta f_m$, in some implementations of the present disclosure, sample indexes may be assigned such that samples within a duration of at least a time of $1/\Delta f_m$ may be distinguished from each other, and the same sample indexes may be used for every period of $1/\Delta f_m$. In some implementations, the receiver may report, to the transmitter, a sample index of a sample at which the intensity of a received signal peaks.

In the examples of FIGS. 12 and 13, since a signal peak is repeated every period of $1/\Delta f_m$, if sample indexes are repeated every period of $1/\Delta f_m$, the receiver may report sample indexes of samples at which the intensity of a received signal most frequently exceeds a specific threshold.

FIG. 13(b) illustrates an example in which the receiver receives RSs under that assumption that time synchronization has been matched, i.e., that the transmitter and the receiver has synchronized the start of a symbol having an RS transmitted by the transmitter.

As illustrated in FIG. 13, the receiver may confirm that a signal peak occurs at the 5th, 105th, 205th, 305th, 405th, 505th, . . . , 905th samples from a synchronization time. In some implementations, the receiver may determine and report that an offset index is sample index 5 (i.e., offset index=5). The transmitter has been aware of $\Delta f_m$ and $\Delta f_n$ used in a beam search block, which is a collection of symbols for continuous beam search, and of sample indices (used by the receiver) based on a synchronization RS, etc. The transmitter has also been aware of spatial values θ and φ corresponding to each sample index. Therefore, the transmitter may be aware of spatial values θ and φ corresponding to the sample index 5, based on the offset index=5 fed back from the receiver.

Example #2: BW=10 GHz, M=2, N=2, $\Delta f_b$=10 MHz, $p_m$=2, $p_n$=1

The antenna array according to Example #1 may be regarded as a UPA since the antennas are arrayed in two directions. In the antenna array according to Example #1, 5 (=2M+1=2*2+1) antennas are arrayed on the x-axis and 5 (=2N+1=2*2+1) antennas are arrayed on the y-axis, so that a total of 25 (=(2M+1)*(2N+1)) antennas is included. For example, the antennas may be arrayed as illustrated in the left view of FIG. 9. The spacing of RSs of the antennas is $\Delta f_m$=100 MHz for x-axis antennas and $\Delta f_n$=100 MHz for y-axis antennas.

Figure 14:
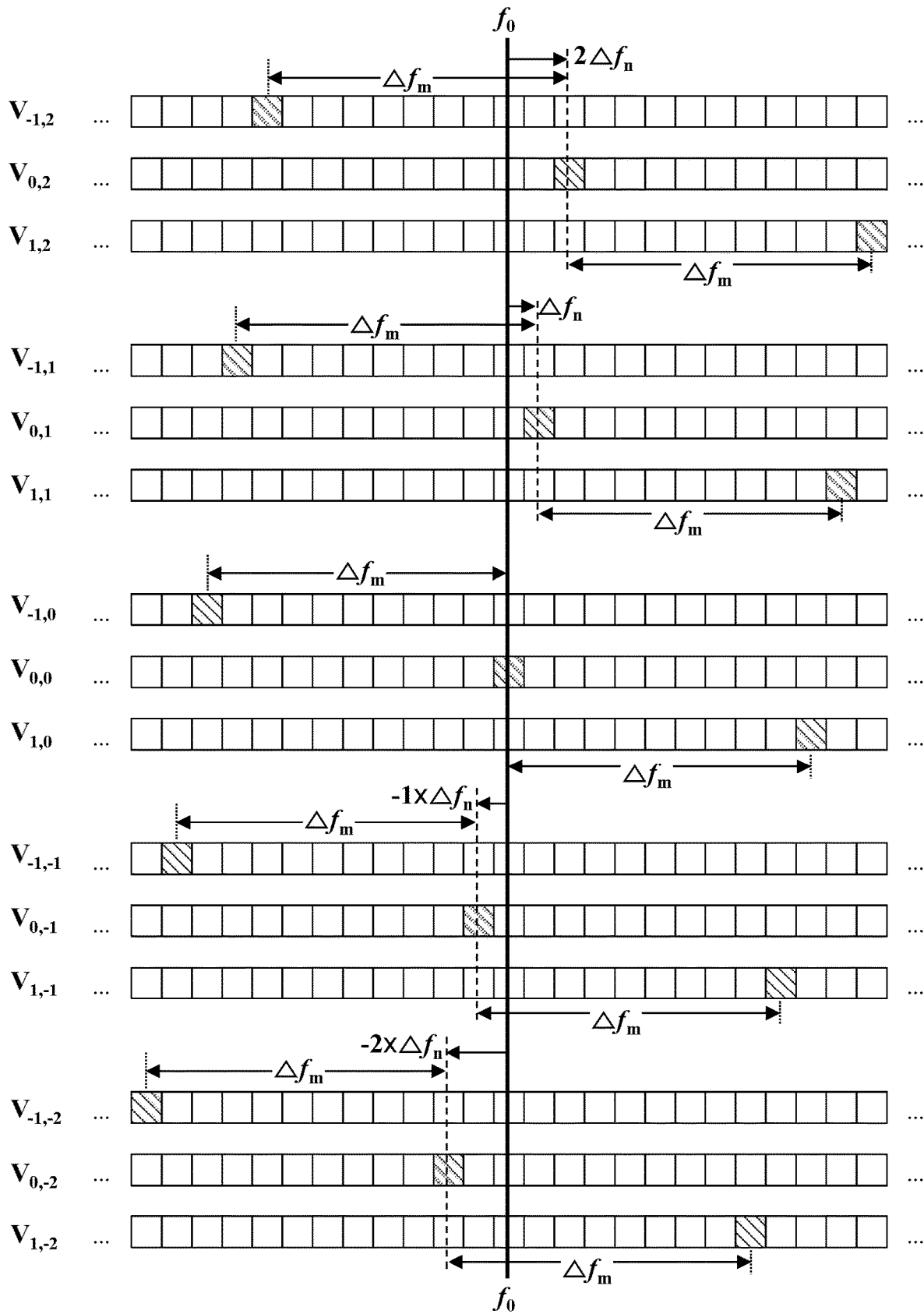
FIG. 14 illustrates another example of frequency locations of reference signals for respective antennas according to some implementations of the present disclosure.

FIG. 14 illustrates another example of frequency locations of RSs for respective antennas according to some implementations of the present disclosure. In particular, FIG. 14 illustrates RSs for respective antennas in an antenna array according to Example #2. In FIG. 14, $V_{m,n}$ represents an antenna having an x-axis antenna index of m and a y-axis antenna index of n, as described in FIG. 9.

As illustrated in FIG. 14, antennas located in an x-axis direction (or in the horizontal domain) based on an antenna $V_{0,0}$ in the center of a corresponding antenna array transmit RSs by shifting the locations of the RSs as much as $\Delta f_m$ in a positive (+) or negative (−) direction (e.g., by shifting the locations of the RSs as much as a positive or negative integer multiple of $\Delta f_m$). In addition, antennas located in a y-axis direction (or in the vertical domain) transmit RSs by shifting the locations of the RSs as much as $\Delta f_n$ (at least one time) in a positive (+) or negative (−) direction (e.g., by shifting the locations of the RSs as much as a positive or negative integer multiple of $\Delta f_n$). Therefore, according to Example #2, an x-axis scanning time is $1/\Delta f_m$=10 ns, and a y-axis scanning time is $1/\Delta f_1$=100 ns.

Figure 15:
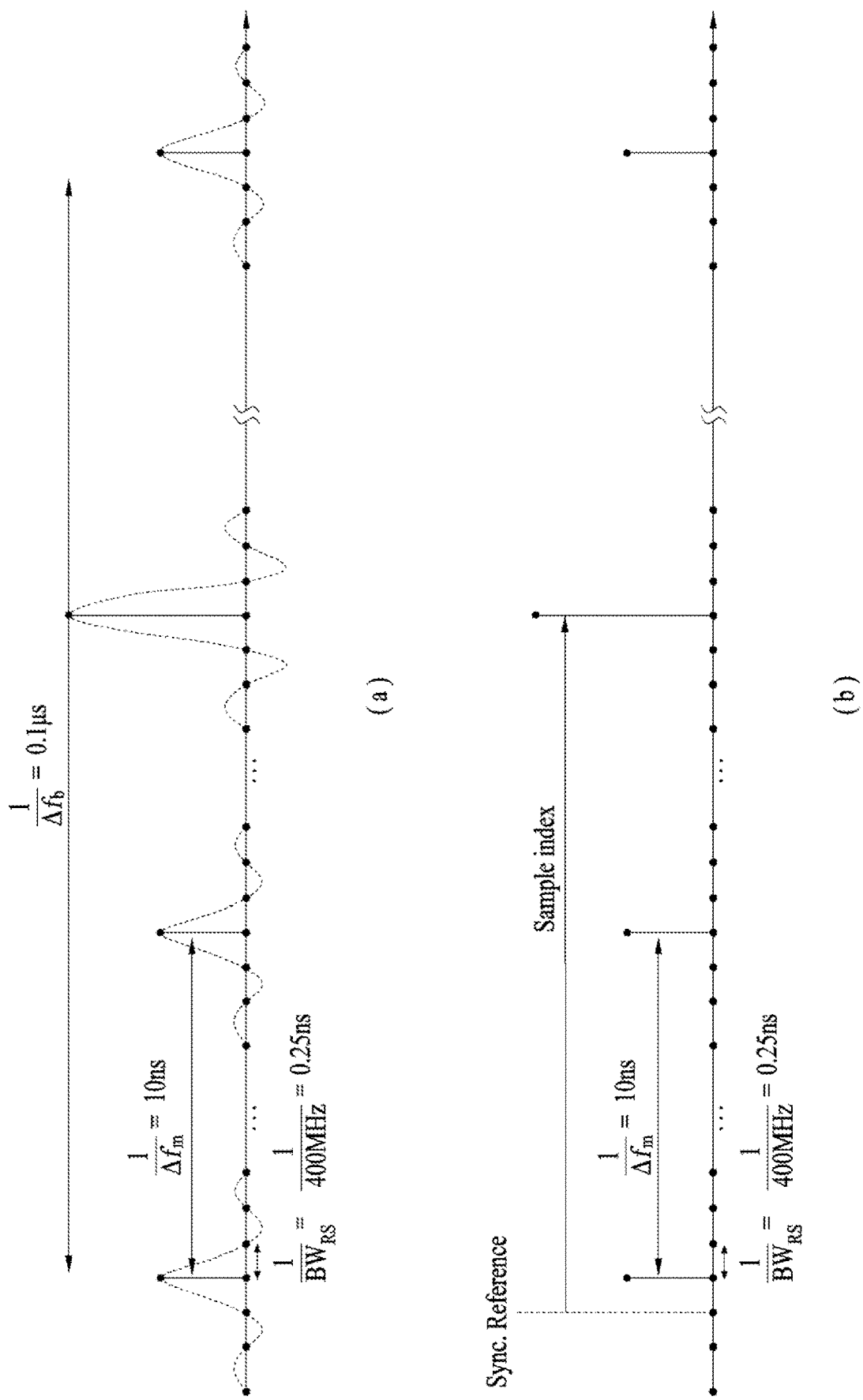
FIG. 15 illustrates forms in which reference signals transmitted according to Example #2 are received by a receiver.

FIG. 15 illustrates forms in which RSs transmitted according to Example #2 are received by a receiver. In particular, FIG. 15 illustrates forms in which the RSs are received by the receiver when the RSs are transmitted in 400 MHz rather than over the entire BW in Example #2. Hereinafter, a BW in which RSs are transmitted is especially indicated as $BW_{RS}$. Accordingly, FIG. 15(a) illustrates the forms of received signals when sampling is performed at a sampling spacing of 0.25 ns based on $BW_{RS}$=400 MHz. In the case of a UPA, when a beam of the transmitter coincides with an azimuth and an elevation of the receiver, the receiver will receive a signal with the largest magnitude. Accordingly, the receiver receiving the signals illustrated in FIG. 15(a) may report, for example, sample indexes illustrated in FIG. 15(b) to the transmitter.

As may be appreciated from Example #1 and Example #2, values may vary according to BW, M, N, $\Delta f_b$, $p_m$, $p_n$, and a measurement sample resolution (e.g., depending on whether to measure a sample index based on BW or based on BWRS). According to a predetermined or prearranged method between the transmitter and the receiver, the transmitter should report a measured/inferred result based on a received RS.

In some implementations, in the case of the UPA, a sample index that the receiver should report to the transmitter (e.g., BS) may be summarized as follows:

$$\max_{i=0 \sim \left(\left\lceil \frac{\Delta f_b}{BW \cdot g.c.d(p_m, p_n)} \right\rceil - 1\right)} \sum_{k=0}^{g.c.d(p_m, p_n)-1} S_{\left(i + k * \left\lceil \frac{\Delta f_b}{BW \cdot g.c.d(p_m, p_n)} \right\rceil\right)}.$$

For example, the receiver may report an index i that maximizes the value of the above equation to the transmitter. Here, Si may be the magnitude or power of the i-th signal sample. Here, g.c.d($p_m, p_n$) represents the greatest common divisor of $p_m$ and $p_n$.

Alternatively, in some implementations, in the case of a ULA, the sample index that the receiver should report to the transmitter (e.g., BS) may be summarized as follows:

$$\max_{i=0 \sim \left(\left\lceil \frac{\Delta f_b}{BW * p_m} \right\rceil - 1\right)} \sum_{k=0}^{p_m - 1} S_{\left(i + k * \left\lceil \frac{\Delta f_b}{BW * p_m} \right\rceil\right)}$$

For example, the receiver may report the index i that maximizes the value of the above equation to the transmitter. Here, Si may be the magnitude or power of the i-th signal sample.

If the transmitter and the receiver promise to use sample indexes based on BWRS, rather than BW, for feedback by the receiver, the receiver reports indexes by replacing BW with $BW_{RS}$ in the above equations. In the above equations, $\lceil x \rceil$ is a natural number not smaller than x.

While examples have been described in which antennas operate conceptually in the form of a frequency gradient in both the horizontal domain and the vertical domain, in some implementations of the present disclosure, antennas may operate conceptually in the form of a frequency gradient only in one of the horizontal domain and the vertical domain and operate in the form of a phase shifter in the other domain.

In Implementation 1, the transmitter and receiver may be a BS and a UE, respectively, a UE and a BS, respectively, or a BS and another BS, respectively, or a UE and another UE, respectively.

Implementation 2) Configuration-Based Beam Tracking

In Implementation 1 described above, when the transmitter is a BS, the BS may broadcast one or more of the following parameters for beam tracking in system information, such as a master information block (MIB) or a system information block (SIB). That is, the BS may transmit one or more of the following parameters to the UEs as a configuration for RSs.

BW: System BW

M: The number of antennas on the horizontal axis (or the number of antenna ports on the horizontal axis or the number of antenna (port) indexes on the horizontal axis)

N: The number of antennas on the vertical axis (or the number of antenna ports on the horizontal axis or the number of antenna (port) indexes on the vertical axis)

$\Delta f_b$: A minimum unit of a frequency spacing (e.g., a subcarrier spacing) used (in a system or corresponding cell)

$p_m$: A natural number (unit: $\Delta f_b$) representing a frequency spacing (of RSs) between antennas on the horizontal axis $p_n$: A natural number (unit: $\Delta f_b$) representing a frequency spacing (of RSs) between antennas on the vertical axis $BW_{RS}$: Transmission BW of an RS Sample resolution: This indicates a sample spacing reference (e.g., a sample spacing of 1/BW or a sample spacing of $1/BW_{RS}$).

Figure 16:
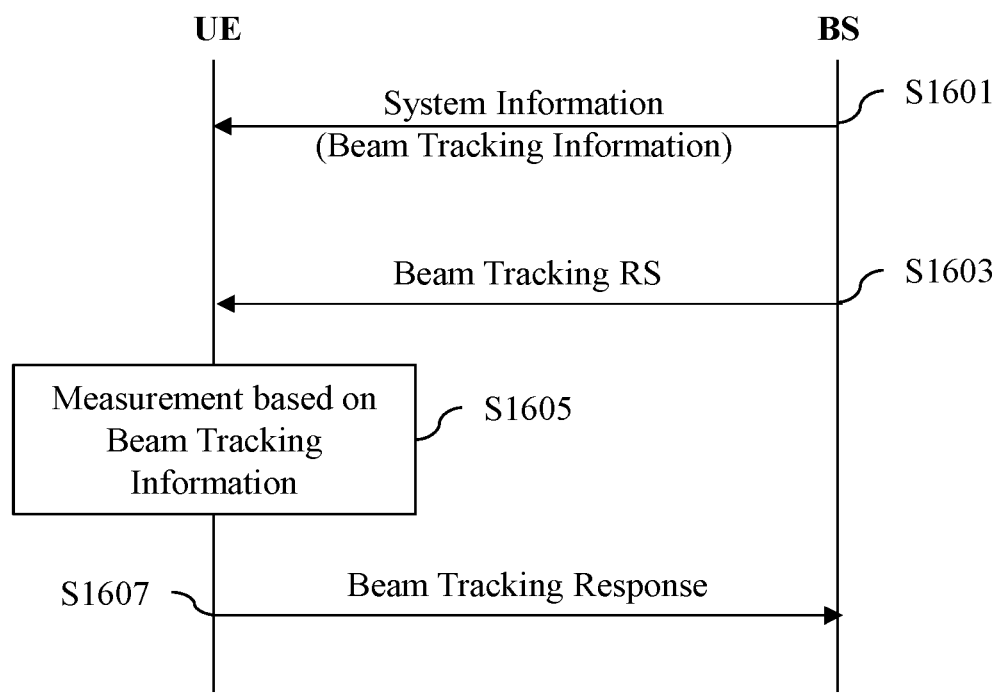
FIG. 16 illustrates an example of a beam tracking flow according to some implementations of the present disclosure.

FIG. 16 illustrates a$_n$ example of a beam tracking flow according to some implementations of the present disclosure.

Referring to FIG. 16, the BS may transmit information for beam tracking in system information to the UE(s) (S1601). The system information including the beam tracking information may be, for example, an MIB, SIB Type 1, a (periodic) SIB message, or an SIB message transmitted in response to a system information request of the UE. For example, the BS may broadcast, in the system information, the beam tracking information including BW=10 GHz, M=10, N=10, $\Delta f_b$=100 MHz, $p_m$=10, $p_n$=4, and sample resolution=0 (1/BW) (or sample resolution=1 ($1/BW_{RS}$)).

The BS may transmit a beam tracking RS (on a cell) according to the beam tracking information that the BS has transmitted (for the cell) (S1603). Upon receiving the beam tracking information broadcast by the BS, the UE may receive the beam tracking RS (on the cell) based on the beam tracking information, perform beam tracking measurement based on the beam tracking information (S1605), and report a result of beam tracking measurement to the BS (S1607). For example, upon receiving the beam tracking information, the UE may determine a sample index of a sample having a signal peak based on the beam tracking information and report the sample index to the BS. The BS may track the UE based on the result of beam tracking measurement (e.g., sample index) reported by the UE.

A transmission position and period of the beam tracking RS may be predetermined in the system, may be preconfigured through system information between the BS and the UEs, or may be dynamically changed and operated through SIB change.

Implementation 2-1) UE Report-Based Dynamic Operation Method

The BS may operate the beam tracking RS by dynamically changing the SIB or the like based on feedbacks received from the UEs.

Regarding beam tracking failure, for example, the following table may be predetermined between the BS and the UE or preconfigured for the UE by the BS.

TABLE 3

| Reason | value |
|---|---|
| No error | 0 |
| error from timing mismatch | 1 |
| error from Interference | 2 |

When feeding back the beam tracking information, the UE may indicate information related to beam tracking failure to the BS by allocating a bit, together with a sample index or separately from the sample index, based on the above table.

Figure 17:
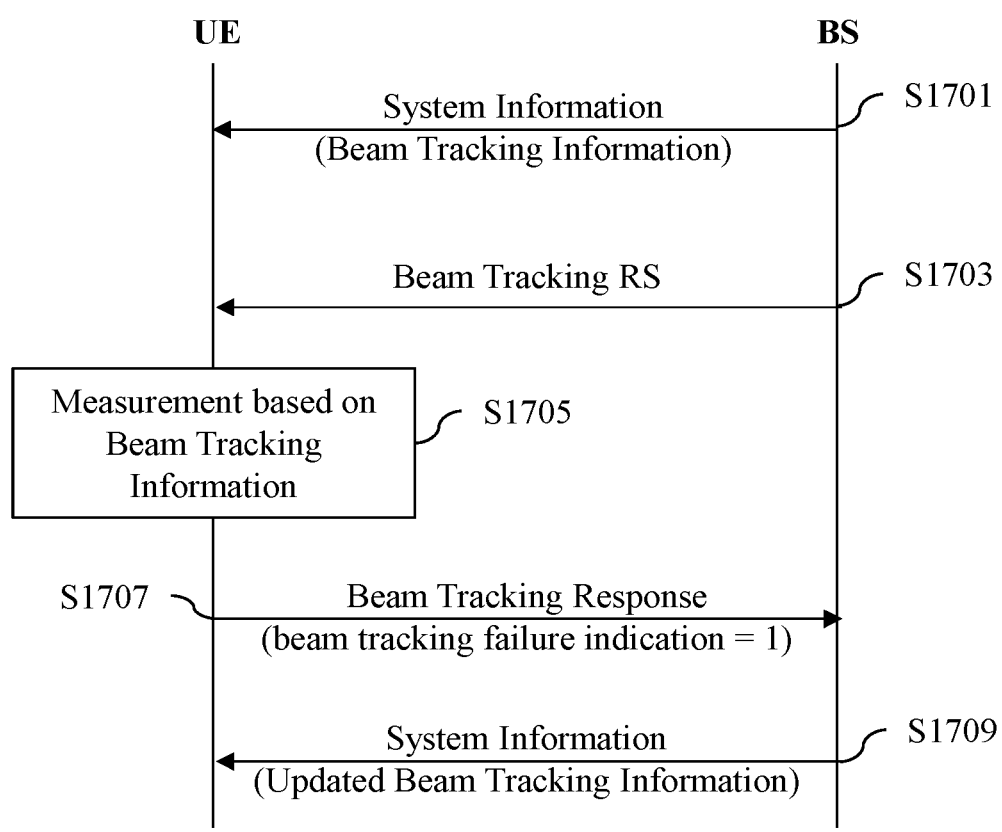
FIG. 17 illustrates another example of the beam tracking flow according to some implementations of the present disclosure.

FIG. 17 illustrates another example of the beam tracking flow according to some implementations of the present disclosure.

Referring to FIG. 17, the BS may transmit information for beam tracking in system information to the UE(s) (S1701). The system information including the beam tracking information may be, for example, an MIB, SIB Type 1, a (periodic) SIB message, or an SIB message transmitted in response to a system information request of the UE. For example, in S1701, the BS may broadcast, in the system information, beam tracking information including BW=10 GHz, M=10, N=10, $\Delta f_b$=100 MHz, $p_m$=10, $p_n$=4, and sample resolution=0 (1/BW) (or sample resolution=1 (1/BW$_{RS}$)).

The BS may transmit a beam tracking RS (on a cell) according to the beam tracking information that the BS has transmitted (for the cell) (S1703). Upon receiving the beam tracking information broadcast by the BS, the UE may perform beam tracking measurement based on the beam tracking information (S1705). However, when the UE determines that a sample index is incapable of being measured or determined due to timing mismatch, that is, due to mismatch of time synchronization of symbol start positions between the UE and the BS, the UE may set a beam tracking failure indication to 1 and report such a situation (S1707). Upon receiving the beam tracking failure indication=1 from the UE or receiving the beam tracking failure indication=1 from multiple UEs, the BS may determine that (multiple) errors occur due to timing mismatch and reduce a frequency spacing between RSs of antennas. The BS may transmit updated beam tracking information including information regarding the reduced frequency spacing through the system information (S1709). For example, when the BS that has transmitted the beam tracking information including BW=10 GHz, M=10, N=10, $\Delta f_b$=100 MHz, $p_m$=10, $p_n$=4, and sample resolution=0 (1/BW) (or sample resolution=1 (1/BW$_{RS}$)) (to the cell) receives a beam tracking response that informs the BS that errors have occurred due to timing mismatch, the BS may transmit the updated beam tracking information including $p_m$=2 and $p_n$=1 to the UEs.

Figure 18:
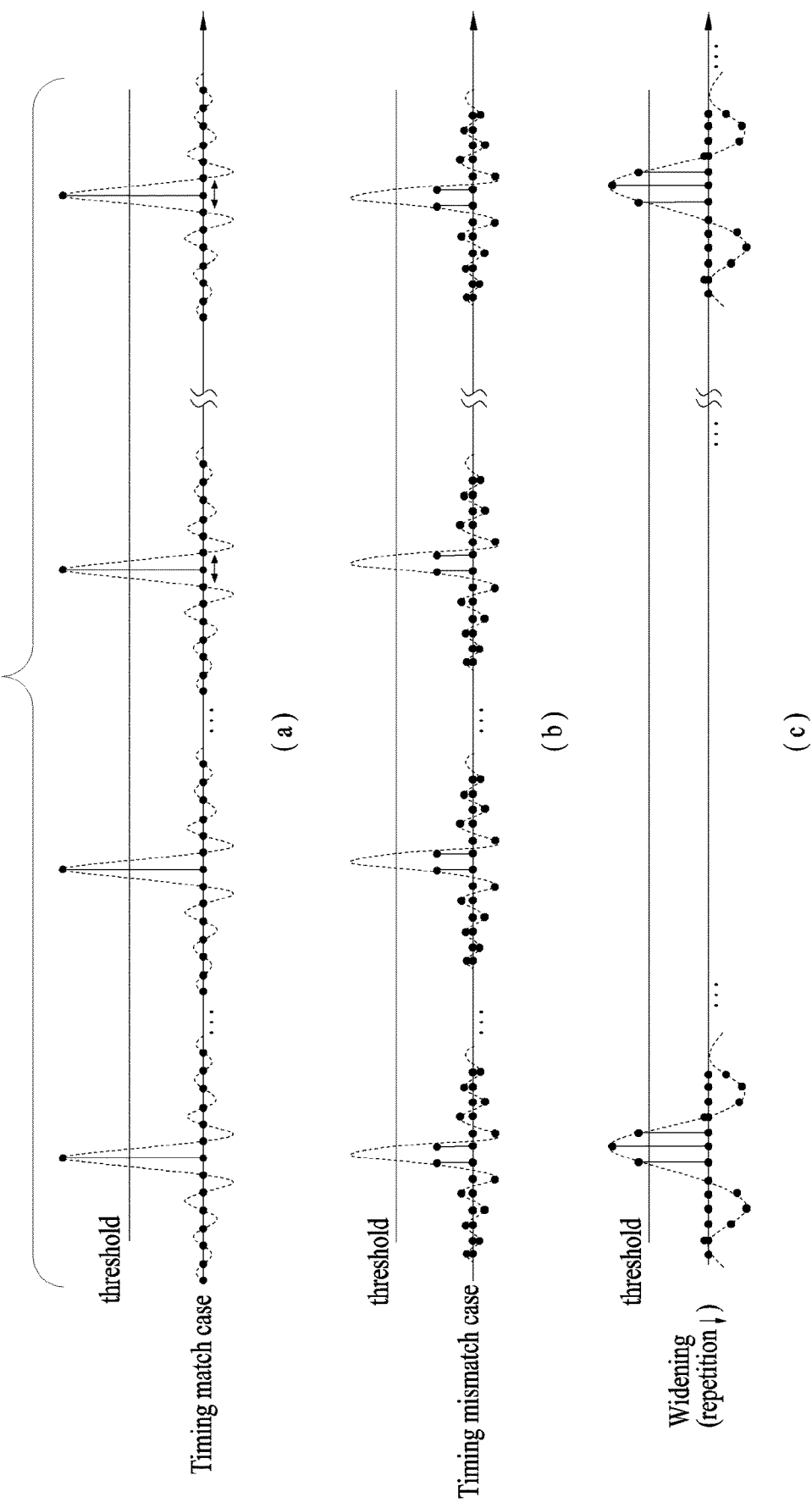
FIG. 18 illustrates examples of received forms of reference signals transmitted according to some implementations of the present disclosure.

FIG. 18 illustrates examples of received forms of RSs transmitted according to some implementations of the present disclosure. In particular, FIG. 18(a) illustrates the received forms of RSs when sampling timings of the RSs in the receiver are correct, FIG. 18(b) illustrates the received forms of RSs when sampling timings of the RSs in the receiver are incorrect, and FIG. 18(c) illustrates the received forms of signals when widening peaks of the signals received at the receiver by reducing $p_m$ and/or $p_n$ for the antennas. As compared with the size of a received signal when the sampling timing is well matched, the size of a received signal when the sampling timing is mismatched may be relatively reduced. Therefore, when timing mismatch occurs, the BS lengthens a period at which a peak of a signal occurs in the UE by reducing $p_m$ and/or $p_n$, whereas the probability that the UE obtains a signal having a size equal to or greater than a threshold may be increased.

Figure 19:
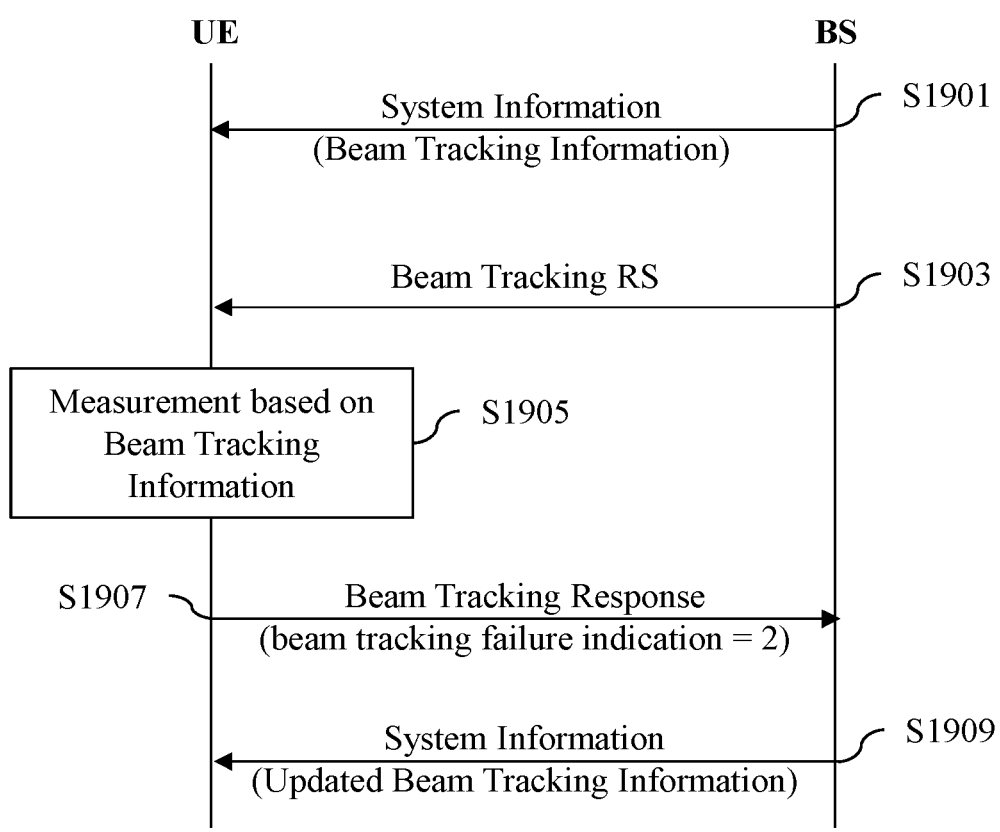
FIG. 19 illustrates another example of the beam tracking flow according to some implementations of the present disclosure.

FIG. 19 illustrates another example of the beam tracking flow according to some implementations of the present disclosure.

Referring to FIG. 19, the BS may transmit information for beam tracking in system information to the UE(s) (S1901). For example, in S1901, the BS may broadcast, in the system information, beam tracking information including BW=10 GHz, M=10, N=10, $\Delta f_b$=100 MHz, $p_m$=2, $p_n$=1, and sample resolution=0 (1/BW) (or sample resolution=1 (1/BW$_{RS}$)).

The BS may transmit a beam tracking RS (on a cell) according to the beam tracking information transmitted by the BS (for the cell) (S1903). Upon receiving the beam tracking information broadcast by the BS, the UE may perform beam tracking measurement based on the beam tracking information (S1905). However, when the UE determines that a sample index is incapable of being measured or determined due to interference, the UE may set a beam tracking failure indication to 2 and report such a situation (S1907). Upon receiving the beam tracking failure indication=2 from the UE or receiving the beam tracking failure indication=2 from multiple UEs, the BS may change the beam tracking information if necessary. The BS may transmit the changed beam tracking information, i.e., updated beam tracking information, through the system information (S1909). For example, when the BS that has transmitted the beam tracking information including BW=10 GHz, M=10, N=10, $\Delta f_b$=100 MHz, $p_m$=2, $p_n$=1, and sample resolution=0 (1/BW) (or sample resolution=1 (1/BW$_{RS}$)) (to the cell) receives a beam tracking response that informs the BS that beam tracking has failed due to interference from the UE(s), the BS may transmit the updated beam tracking information including $p_m$=10 and $p_n$=4 to the UEs.

Figure 20:
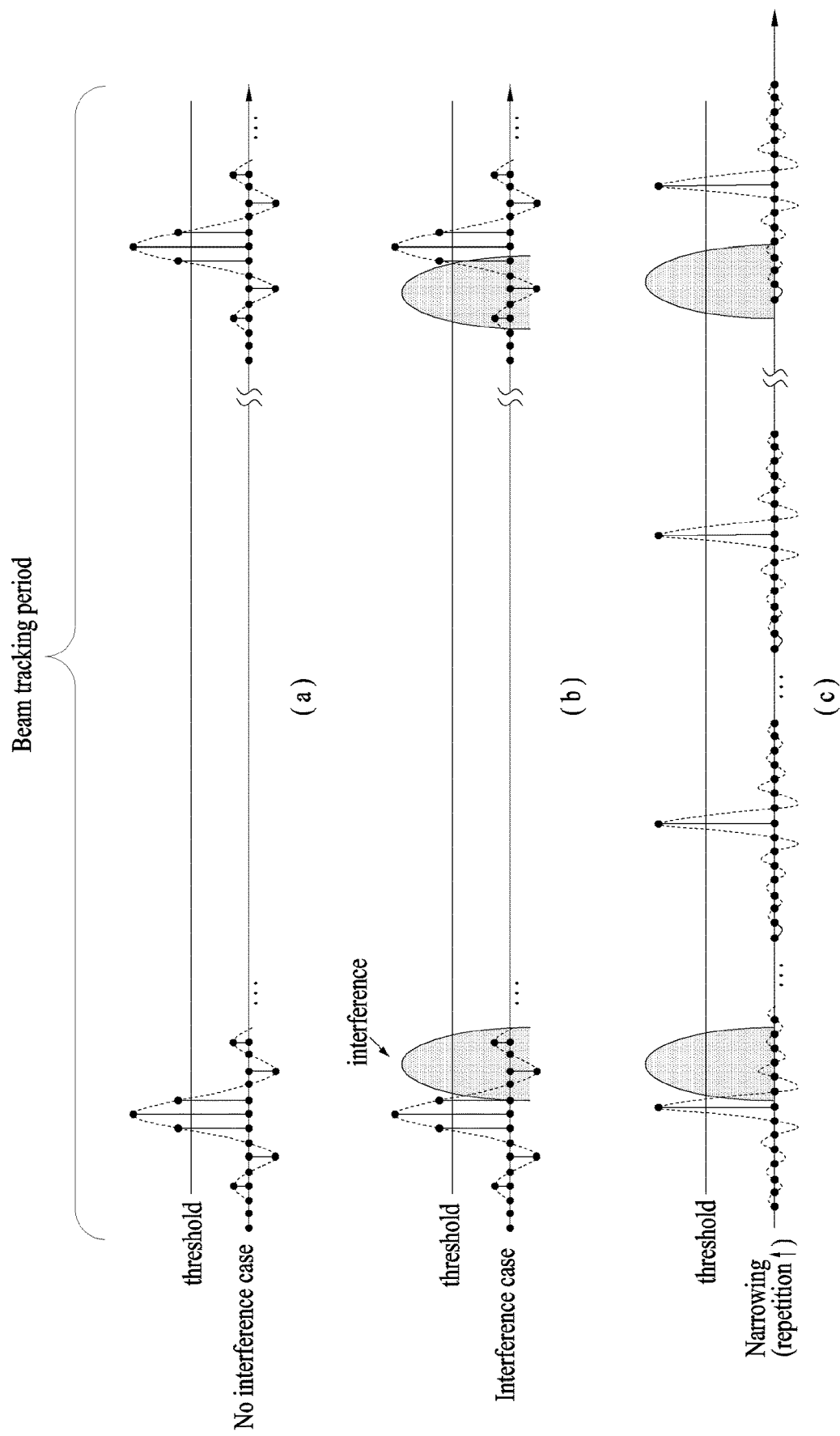
FIG. 20 illustrates other examples of received forms of reference signals transmitted according to some implementations of the present disclosure.

FIG. 20 illustrates other examples of received forms of RSs transmitted according to some implementations of the present disclosure. In particular, FIG. 20(a) illustrates the received forms of RSs when there is no interference with the RSs, FIG. 20(b) illustrates the received forms of the RSs when there is interference with the RSs, and FIG. 20(c) illustrates the received forms of signals when narrowing peaks of the signals received at the receiver by increasing $p_m$ and/or $p_n$ for the antennas. As compared with the size of a received signal when interference occurs, the size of a sample that is subjected to interference when interference occurs may be relatively increased. Therefore, when interference occurs, the BS decreases a period at which a peak of a signal occurs in the UE by increasing $p_m$ and/or $p_n$, whereas the probability that a peak of a sample that is not subjected to interference during a repetition period occurs may be increased.

In implementation 2, while the case in which the BS is a transmitter and the UE is a receiver has been described as an example, in the case in which the UE is the transmitter, the BS may transmit a configuration for beam tracking RSs of the UE to the UE. For example, the BS may transmit a configuration including all or some of the above parameters for beam tracking to the UE. The UE may transmit UL RSs based on the configuration, and the BS may perform measurement on the UL RSs of the UE based on the configuration.

According to some implementations of the present disclosure, continuous beam scanning may be performed on a target cell area. According to some implementations of the present disclosure, the resolution of a physical direction of a beam controllable by the transmitter performing beam steering may be infinitely adjusted. According to some implementations of the present disclosure, very fast beam steering (at a sample level) may be performed in the target cell area. According to some implementations of the present disclosure, the transmitter may not use a phase shifter for beam steering, or the number of phase shifters for beam steering may be minimized.

A transmission device may perform operations according to some implementations of the present disclosure in association with transmission of RSs. The transmission device may include at least one transceiver; at least one processor; and at least one computer memory operably connectable to the at least one processor and storing instructions that, when executed, cause the at least one processor to perform operations according to some implementations of the present disclosure. A processing device for the transmission device may include at least one processor; and at least one computer memory operably connectable to the at least one processor and storing instructions that, when executed, cause the at least one processor to perform operations according to some implementations of the present disclosure. A computer-readable (non-volatile) storage medium may store at least one computer program including instructions that, when executed by at least one processor, cause the at least one processor to perform operations according to some implementations of the present disclosure. A computer program or a computer program product may be recorded in at least one computer-readable (non-volatile) storage medium and may include instructions that cause, when executed, (at least one processor) to perform operations according to some implementations of the present disclosure.

In the transmission device, the processing device, the computer-readable (non-volatile) storage medium, and/or the computer program product, the operations include: mapping respective reference signals for plural antennas of the transmission device to frequency resources; and transmitting the reference signals on the frequency resources. The mapping the reference signals to the frequency resources includes mapping the reference signals such that: i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and ii) a frequency difference between the frequency resource $f_{m,n}$ and a frequency resource $f_{m,n-1}$ for a reference signal of an antenna $V_{m,n-1}$ is $\Delta f_n$. Here, m denotes an antenna index according to a first direction, and n denotes an antenna index according to a second direction orthogonal to the first direction.

In some implementations of the present disclosure, the operations may include transmitting a configuration for the reference signals.

In some implementations of the present disclosure, the configuration may include information regarding $\Delta f_m$ and information regarding $\Delta f_n$.

In some implementations of the present disclosure, the configuration may include information regarding the number of antennas of the first direction and information regarding the number of antennas of the second direction.

In some implementations of the present disclosure, the configuration may include information regarding a sample resolution for sampling. In some implementations of the present disclosure, the information regarding the sample resolution may include information regarding a system bandwidth of a cell in which the reference signals are transmitted or regarding a bandwidth in which the reference signals are transmitted.

In some implementations of the present disclosure, the operations may include receiving information regarding a position of a signal peak from the reception device.

In some implementations of the present disclosure, the transmission device may be a BS.

In some implementations of the present disclosure, the transmission device may be a UE.

A reception device may perform operations according to some implementations of the present disclosure in association with reception of RSs. The reception device may include at least one transceiver; at least one processor; and at least one computer memory operably connectable to the at least one processor and storing instructions that, when executed, cause the at least one processor to perform operations according to some implementations of the present disclosure. A processing device for the reception device may include at least one processor; and at least one computer memory operably connectable to the at least one processor and storing instructions that, when executed, cause the at least one processor to perform operations according to some implementations of the present disclosure. A computer-readable (non-volatile) storage medium may store at least one computer program including instructions that, when executed by at least one processor, cause the at least one processor to perform operations according to some implementations of the present disclosure. A computer program or a computer program product may be recorded in at least one computer-readable (non-volatile) storage medium and may include instructions that cause, when executed, (at least one processor) to perform operations according to some implementations of the present disclosure.

In the reception device, the processing device, the computer-readable (non-volatile) storage medium, and/or the computer program product, the operations may include: receiving a signal including respective reference signals for plural antennas of a transmission device; determining peak information regarding a position of a peak of the signal, based on a first frequency difference $\Delta f_m$ between reference signals of adjacent antennas in a first direction among the plural antennas and on a second frequency difference $\Delta f_n$ between reference signals of adjacent antennas in a second direction, which is orthogonal to the first direction, among the plural antennas; and transmitting the peak information to the transmission device.

In some implementations of the present disclosure, the operations may include: receiving a configuration for the reference signals.

In some implementations of the present disclosure, the configuration may include information regarding $\Delta f_m$ and information regarding $\Delta f_n$.

In some implementations of the present disclosure, the configuration may further include information regarding the number of antennas of the first direction and information regarding the number of antennas of the second direction.

In some implementations of the present disclosure, the configuration may further include information regarding a sample resolution for sampling. In some implementations of the present disclosure, the information regarding the sample resolution includes information regarding a system bandwidth of a cell in which the reference signals are received or regarding a bandwidth in which the reference signals are received.

In some implementations of the present disclosure, the peak information may be an index of a sample at which the peak of the signal is generated.

In some implementations of the present disclosure, the reception device may be a UE.

In some implementations of the present disclosure, the reception device may be a BS.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method of transmitting reference signals for a plurality of antennas by a transmission device in a wireless communication system, the method comprising:
mapping respective reference signals for the plural antennas to frequency resources; and
transmitting the reference signals on the frequency resources,
wherein the mapping the reference signals to the frequency resources includes mapping the reference signals such that:
i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and
ii) a frequency difference between the frequency resource $f_{m,n}$ and a frequency resource $f_{m,n-1}$ for a reference signal of an antenna $V_{m,n-1}$ is $\Delta f_n$,
where m denotes an antenna index according to a first direction, and n denotes an antenna index according to a second direction orthogonal to the first direction.

2. The method of claim 1, further comprising:
transmitting a configuration for the reference signals, wherein the configuration includes information regarding $\Delta f_m$ and information regarding $\Delta f_n$.

3. The method of claim 2, wherein the configuration further includes information regarding the number of antennas of the first direction and information regarding the number of antennas of the second direction.

4. The method of claim 2, wherein the configuration further includes information regarding a sample resolution for sampling.

5. The method of claim 4, wherein the information regarding the sample resolution includes information regarding a system bandwidth of a cell in which the reference signals are transmitted or regarding a bandwidth in which the reference signals are transmitted.

6. The method of claim 1, further comprising:
receiving information regarding a position of a signal peak from a reception device.

7. The method of claim 6, wherein the information regarding the position of the signal peak is an index of a sample at which the signal peak is generated.

8. A transmission device for transmitting reference signals for a plurality of antennas in a wireless communication system, the transmission device comprising:
the plural antennas;
at least one transceiver;
at least one processor; and
at least one computer memory operably connectable to the at least one processor and configured to store instructions that, when executed, cause the at least one processor to perform operations comprising:
mapping respective reference signals for the plural antennas to frequency resources; and
transmitting the reference signals on the frequency resources, and
wherein the mapping the reference signals to the frequency resources includes mapping the reference signals such that:
i) a frequency difference between a frequency resource $f_{m,n}$ for a reference signal of an antenna $V_{m,n}$ and a frequency resource $f_{m-1,n}$ for a reference signal of an antenna $V_{m-1,n}$ is $\Delta f_m$, and
ii) a frequency difference between the frequency resource $f_{m,n}$ and a frequency resource $f_{m,n-1}$ for a reference signal of an antenna $V_{m,n-1}$ is $\Delta f_n$,
where m denotes an antenna index according to a first direction, and n denotes an antenna index according to a second direction orthogonal to the first direction.

9. A method of receiving reference signals by a reception device in a wireless communication system, the method comprising:
receiving a signal including respective reference signals for plural antennas of a transmission device;
determining peak information regarding a position of a peak of the signal, based on a first frequency difference $\Delta f_m$ between reference signals of adjacent antennas in a first direction among the plural antennas and on a second frequency difference $\Delta f_n$ between reference signals of adjacent antennas in a second direction, which is orthogonal to the first direction, among the plural antennas; and
transmitting the peak information to the transmission device.

10. The method of claim 9, further comprising receiving a configuration for the reference signals, wherein the configuration includes information regarding the first frequency difference $\Delta f_m$ and information regarding the second frequency difference $\Delta f_n$.

11. The method of claim 10, wherein the configuration further includes information regarding the number of antennas of the first direction and information regarding the number of antennas of the second direction.

12. The method of claim 10, wherein the configuration further includes information regarding a sample resolution for sampling.

13. The method of claim 12, wherein the information regarding the sample resolution includes information regarding a system bandwidth of a cell in which the reference signals are received or regarding a bandwidth in which the reference signals are received.

14. The method of claim 9, wherein the peak information is an index of a sample at which the peak of the signal is generated.

* * * * *